(12) United States Patent
Santiago et al.

(10) Patent No.: US 10,960,619 B2
(45) Date of Patent: Mar. 30, 2021

(54) HOLLOW BLADDER REPAIR PROCESS

(71) Applicant: The Boeing Company, Chicago, IL (US)

(72) Inventors: Jonathan A. Santiago, Seattle, WA (US); Michael A. Lee, Kent, WA (US); Kin Ung, Lynnwood, WA (US); John D. Morris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 16/378,208

(22) Filed: Apr. 8, 2019

(65) Prior Publication Data

US 2020/0316883 A1  Oct. 8, 2020

(51) Int. Cl.
*B29C 73/10* (2006.01)
*B29C 73/34* (2006.01)
(Continued)

(52) U.S. Cl.
CPC .............. *B29C 73/10* (2013.01); *B29C 73/34* (2013.01); *B29C 65/18* (2013.01);
(Continued)

(58) Field of Classification Search
CPC ......... B29C 73/10; B29C 73/12; B29C 65/00; B29C 65/02; B29C 65/18; B29C 65/30; B29C 65/48; B29C 65/4825; B29C 65/50; B29C 65/72; B29C 65/76; B29C 66/0224; B29C 66/41; B29C 73/33; B29C 65/66; B29C 65/0224; B29C 65/41; B29C 65/47; B29C 65/472; B29C 65/4722; B29C 65/494; B29C 70/44; B29C 70/446; B29C 33/505; B29C 43/3642; B29C 2043/3649; B29C 2043/505; B29C 73/26; B29C 73/30; B29C 73/34; B29C 2073/262; B29C 2073/264; B29K 2021/00; B29K 2105/246; B32B 25/00; B32B 25/04; B32B 25/042; B32B 25/10; B29D 99/0003; B29D 22/02; B29L 2031/3085
(Continued)

(56) References Cited

U.S. PATENT DOCUMENTS

| | | | | |
|---|---|---|---|---|
| 1,645,413 | A * | 10/1927 | Burrow ................... | B29C 73/10 152/371 |
| 2,339,559 | A * | 1/1944 | Charnes .............. | B29C 65/5042 156/95 |
| 3,251,721 | A * | 5/1966 | Johnson .................. | B29C 73/10 156/97 |
| 3,448,784 | A * | 6/1969 | Sons, Jr. ................. | B29C 73/10 152/370 |

(Continued)

*Primary Examiner* — Philip C Tucker
*Assistant Examiner* — Brian R Slawski
(74) *Attorney, Agent, or Firm* — Kunzler Bean & Adamson

(57) ABSTRACT

Disclosed herein is a method of repairing surface damage in an exterior surface of a hollow bladder, made of a cured elastomer. The method comprises placing first strips, made of an uncured elastomer, at least partially within the surface damage in the exterior surface of the hollow bladder in a side-by-side arrangement. The method also comprises sealing the surface damage, the first strips, and a portion of the exterior surface surrounding the surface damage in a vacuum bag. The method further comprises reducing pressure within the vacuum bag relative to outside the vacuum bag. The method additionally comprises while the pressure within the vacuum bag is reduced, heating the first strips from within the vacuum bag to cure the first strips.

20 Claims, 21 Drawing Sheets

(51) Int. Cl.
    *B29L 31/30*       (2006.01)
    *B32B 25/04*       (2006.01)
    *B29C 65/18*       (2006.01)
    *B29C 65/48*       (2006.01)
    *B29C 65/50*       (2006.01)
    *B29C 65/76*       (2006.01)
    *B29C 65/00*       (2006.01)
    *B32B 25/10*       (2006.01)
    *B29C 65/72*       (2006.01)

(52) U.S. Cl.
    CPC .......... *B29C 65/4825* (2013.01); *B29C 65/50* (2013.01); *B29C 65/72* (2013.01); *B29C 65/76* (2013.01); *B29C 66/0224* (2013.01); *B29L 2031/3085* (2013.01); *B32B 25/042* (2013.01); *B32B 25/10* (2013.01)

(58) Field of Classification Search
    USPC .. 156/60, 94, 95, 96, 97, 98, 153, 156, 247, 156/285, 286, 289, 293, 297, 298, 299, 156/300, 307.1, 307.7, 323; 244/119, 244/120; 264/313, 314; 269/47, 48.1; 425/389, 470
See application file for complete search history.

(56) References Cited

U.S. PATENT DOCUMENTS

| | | | | |
|---|---|---|---|---|
| 3,730,247 | A * | 5/1973 | White | B29C 73/10 |
| | | | | 152/367 |
| 4,435,470 | A * | 3/1984 | Niconchuk | B29C 73/06 |
| | | | | 152/367 |
| 4,798,640 | A * | 1/1989 | Koch | B29C 73/10 |
| | | | | 152/367 |
| 5,958,166 | A * | 9/1999 | Walters | B29C 73/04 |
| | | | | 156/94 |
| 2010/0276064 | A1* | 11/2010 | Blanchard | B29C 65/526 |
| | | | | 156/94 |
| 2011/0094644 | A1* | 4/2011 | Colby | B29C 73/10 |
| | | | | 152/367 |
| 2012/0080135 | A1* | 4/2012 | Evens | B32B 37/10 |
| | | | | 156/94 |
| 2015/0306712 | A1* | 10/2015 | Devasia | B29C 73/34 |
| | | | | 29/402.21 |
| 2016/0009036 | A1* | 1/2016 | Nolan | B29C 73/12 |
| | | | | 264/36.22 |
| 2016/0046044 | A1* | 2/2016 | Santiago | B29C 33/505 |
| | | | | 425/440 |
| 2019/0030842 | A1* | 1/2019 | Miranda | B64F 5/40 |

* cited by examiner

HOLLOW BLADDER REPAIR PROCESS

FIELD

This disclosure relates generally to hollow bladders for forming parts, and more particularly to repairing hollow bladders for forming elongated stringers for aircraft.

BACKGROUND

Hollow bladders made of elastomeric material are used to help shape parts made of fiber-reinforced polymeric materials. For shaping large parts, such as stringers of an aircraft, hollow bladders must also be large. Often, the manufacturing of new hollow bladders is both time-consuming and expensive due to the complexity of the process and the type of elastomeric materials used.

Hollow bladders are susceptible to damage, which can have undesirable affects on the parts being shaped by the hollow bladders. Replacing damaged hollow bladders with new ones is both inefficient and costly. However, repairing damage to hollow bladders, without negatively affecting the integrity of the hollow bladders, can be difficult.

SUMMARY

The subject matter of the present application has been developed in response to the present state of the art, and in particular, in response to the shortcomings associated with damaged hollow bladders, that have not yet been fully solved by currently available techniques. Accordingly, the subject matter of the present application has been developed to provide methods of repairing hollow bladders that overcome at least some of the above-discussed shortcomings of prior art techniques.

The following is a non-exhaustive list of examples, which may or may not be claimed, of the subject matter, disclosed herein.

Disclosed herein is a method of repairing surface damage in an exterior surface of a hollow bladder, made of a cured elastomer. The method comprises placing first strips, made of an uncured elastomer, at least partially within the surface damage in the exterior surface of the hollow bladder in a side-by-side arrangement. The method also comprises sealing the surface damage, the first strips, and a portion of the exterior surface surrounding the surface damage in a vacuum bag. The method further comprises reducing pressure within the vacuum bag relative to outside the vacuum bag. The method additionally comprises while the pressure within the vacuum bag is reduced, heating the first strips from within the vacuum bag to cure the first strips. The preceding subject matter of this paragraph characterizes example 1 of the present disclosure.

The method further comprises applying a peel ply onto the exterior surface of the hollow bladder away from the surface damage in the exterior surface. The method also comprises placing a caul plate assembly, comprising a caul plate and a breathable release film, onto the exterior surface, over an entirety of the surface damage in the exterior surface, and onto the peel ply such that the breathable release film is interposed between the surface damage and the caul plate and the breathable release film is interposed between the peel ply and the caul plate. The method further comprises placing a heating blanket onto the caul plate assembly. The method additionally comprises sealing the peel ply, the caul plate assembly, and the heating blanket, together with the surface damage, the first strips, and the portion of the exterior surface surrounding the surface damage, in the vacuum bag. The first strips are heated from within the vacuum bag by the heating blanket. The preceding subject matter of this paragraph characterizes example 2 of the present disclosure, wherein example 2 also includes the subject matter according to example 1, above.

The method further comprises placing a woven polyester ply onto the heating blanket such that the woven polyester ply is interposed between the heating blanket and the vacuum bag. The method also comprises sealing the woven polyester ply within the vacuum bag. The preceding subject matter of this paragraph characterizes example 3 of the present disclosure, wherein example 3 also includes the subject matter according to example 2, above.

The method further comprises applying a secondary peel ply onto the heating blanket such that the heating blanket is interposed between the secondary peel ply and the caul plate assembly. The preceding subject matter of this paragraph characterizes example 4 of the present disclosure, wherein example 4 also includes the subject matter according to any one of examples 2-3, above.

Sealing the surface damage, the first strips, and a portion of the exterior surface surrounding the surface damage in the vacuum bag comprises applying a pressure-sensitive sealant tape onto the exterior surface of the hollow bladder and adhering the vacuum bag to the pressure-sensitive sealant tape. The preceding subject matter of this paragraph characterizes example 5 of the present disclosure, wherein example 5 also includes the subject matter according to any one of examples 1-4, above.

The surface damage is a through-hole, extending from the exterior surface to an interior surface of the hollow bladder. The method further comprises placing second strips, made of the uncured elastomer, within the through-hole in a stacked arrangement such that the second strips are interposed between the first strips and an interior cavity of the hollow bladder. The preceding subject matter of this paragraph characterizes example 6 of the present disclosure, wherein example 6 also includes the subject matter according to any one of examples 1-5, above.

The method further comprises placing a third strip, made of a fiber-reinforced polymer, within the through-hole between the second strips. The preceding subject matter of this paragraph characterizes example 7 of the present disclosure, wherein example 7 also includes the subject matter according to example 6, above.

The method further comprises placing third strips, made of a fiber-reinforced polymer, within the through-hole, between the second strips such that each one of the third strips is sandwiched between a respective two of the second strips. The preceding subject matter of this paragraph characterizes example 8 of the present disclosure, wherein example 8 also includes the subject matter according to any one of examples 6-7, above.

The method further comprises forming a bevel around an entire perimeter of the through-hole, wherein the first strips are further placed at least partially within a space defined by the bevel. The preceding subject matter of this paragraph characterizes example 9 of the present disclosure, wherein example 9 also includes the subject matter according to any one of examples 6-8, above.

The method further comprises sealing the through-hole along an interior surface of the hollow bladder with a pressure-sensitive sealant tape adhered to the interior surface of the hollow bladder. The preceding subject matter of this paragraph characterizes example 10 of the present disclosure, wherein example 10 also includes the subject matter according to any one of examples 6-9, above.

The method further comprises removing the pressure-sensitive sealant tape from the interior surface of the hollow bladder after the first strips are cured. The preceding subject matter of this paragraph characterizes example 11 of the present disclosure, wherein example 11 also includes the subject matter according to example 10, above.

The method further comprises placing a release film within the through-hole between the second strips and the pressure-sensitive sealant tape. The preceding subject matter of this paragraph characterizes example 12 of the present disclosure, wherein example 12 also includes the subject matter according to any one of examples 10-11, above.

Further disclosed herein is a method of repairing a through-hole in a hollow bladder, made of a cured elastomer, the through-hole extending from an exterior surface of the hollow bladder to an interior surface of the hollow bladder. The method comprises placing at least one strip, made of an uncured elastomer, within the through-hole of the hollow bladder. The method also comprises sealing the through-hole along the interior surface of the hollow bladder with a pressure-sensitive sealant tape adhered to the interior surface of the hollow bladder. The method further comprises reducing a pressure at the exterior surface around the through-hole, to below atmospheric pressure, after the through-hole is sealed along the interior surface with the pressure-sensitive sealant tape. The method additionally comprises curing the at least one strip by heating the at least one strip while the through-hole is sealed along the interior surface by the pressure-sensitive sealant tape and while the pressure at the exterior surface around the through-hole is reduced. The method also comprises removing the pressure-sensitive sealant tape from the interior surface of the hollow bladder after the at least one strip is cured. The preceding subject matter of this paragraph characterizes example 13 of the present disclosure.

The method further comprises inserting the pressure-sensitive sealant tape, from a location exterior to the hollow bladder, through the through-hole and into an interior cavity of the hollow bladder before sealing the through-hole along the interior surface of the hollow bladder with the pressure-sensitive sealant tape. Removing the pressure-sensitive sealant tape from the interior surface of the hollow bladder comprises passing the pressure-sensitive sealant tape along the interior cavity of the hollow bladder and out of the hollow bladder at a location away from the through-hole. The preceding subject matter of this paragraph characterizes example 14 of the present disclosure, wherein example 14 also includes the subject matter according to example 13, above.

The method further comprises passing a retrieval line and a hook, fixed to a leading end of the retrieval line, along the interior cavity of the hollow bladder in a first direction toward the through-hole. The method also comprises after passing the retrieval line and the hook along the interior cavity in the first direction, inserting the hook, from a location within the interior cavity, through the through-hole to a location exterior to the hollow bladder. The method additionally comprises attaching the pressure-sensitive sealant tape to the hook after inserting the hook through the through-hole to the location exterior to the hollow bladder. The method also comprises after attaching the pressure-sensitive sealant tape to the hook, inserting the hook, from the location exterior to the hollow bladder, through the through-hole and into the interior cavity of the hollow bladder in substantially the first direction to insert the pressure-sensitive sealant tape, from the location exterior to the hollow bladder, through the through-hole and into the interior cavity in substantially the first direction. The preceding subject matter of this paragraph characterizes example 15 of the present disclosure, wherein example 15 also includes the subject matter according to example 14, above.

Removing the pressure-sensitive sealant tape from the interior surface of the hollow bladder comprises pulling the retrieval line in a second direction, substantially opposite the first direction, through the interior cavity of the hollow bladder to pull the pressure-sensitive sealant tape away from the interior surface and through the interior cavity of the hollow bladder in the first direction. The preceding subject matter of this paragraph characterizes example 16 of the present disclosure, wherein example 16 also includes the subject matter according to example 15, above.

The pressure-sensitive sealant tape comprises a first portion, having a first length greater than a length of the through-hole, and a second portion spaced apart from the first portion. The second portion is attached to the hook. The method further comprises wrapping the second portion of the pressure-sensitive sealant tape with anti-stick tape. The preceding subject matter of this paragraph characterizes example 17 of the present disclosure, wherein example 17 also includes the subject matter according to any one of examples 15-16, above.

The method further comprises attaching an installation line to the pressure-sensitive sealant tape before the pressure-sensitive sealant tape is inserted through the through-hole and into the interior cavity of the hollow bladder. Sealing the through-hole along the interior surface of the hollow bladder with the pressure-sensitive sealant tape comprises inserting a first portion of the installation line through the through-hole and into the interior cavity along with the pressure-sensitive sealant tape, leaving a second portion of the installation line exteriorly of the hollow bladder after the pressure-sensitive sealant tape is inserted into the interior cavity, and, with the pressure-sensitive sealant tape inserted into the interior cavity, pulling the second portion of the installation line away from the interior cavity to raise the pressure-sensitive sealant tape into adhering contact with the interior surface of the hollow bladder. The preceding subject matter of this paragraph characterizes example 18 of the present disclosure, wherein example 18 also includes the subject matter according to any one of examples 14-17, above.

Attaching the installation line to the pressure-sensitive sealant tape comprises attaching a first end portion to a first location on the pressure-sensitive sealant tape and attaching a second end portion to a second location on the pressure-sensitive sealant tape. The first location is spaced apart from the second location by a distance less than a maximum length of the through-hole. Inserting the first portion of the installation line through the through-hole and into the interior cavity comprises inserting a first portion of the first end portion of the installation line and a first portion of the second end portion of the installation line through the through-hole and into the interior cavity. Leaving a second portion of the installation line exteriorly of the hollow bladder after the pressure-sensitive sealant tape is inserted into the interior cavity comprises leaving a second portion of the first end portion of the installation line and a second portion of the second end portion of the installation line exteriorly of the hollow bladder after the pressure-sensitive sealant tape is inserted into the interior cavity. Pulling the second portion of the installation line away from the interior cavity comprises evenly pulling the second portion of the first end portion and the second portion of the second end portion of the installation line away from the interior cavity. The preceding subject matter of this paragraph characterizes example 19 of the present disclosure, wherein example 19 also includes the subject matter according to example 18, above.

Additionally disclosed herein is a method of repairing surface damage in an exterior surface of a hollow bladder, made of a cured fluoroelastomer. The method comprises placing first strips, made of an uncured fluoroelastomer, at least partially within the surface damage in the exterior surface of the hollow bladder. The method also discloses reducing a pressure at the exterior surface, around the surface damage and the first strips, to below atmospheric pressure. The method further discloses, while the pressure at the exterior surface around the surface damage and the first strips is reduced, curing the first strips, by, in order: heating the first strips at a first temperature of 175 F for fifteen minutes, heating the first strips at a second temperature of 185 F for ten minutes, heating the first strips at a third temperature of 195 F for ten minutes, heating the first strips at a fourth temperature of 280 F for ten minutes, and heating the first strips at a fifth temperature of 365 F for ten minutes. The preceding subject matter of this paragraph characterizes example 20 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
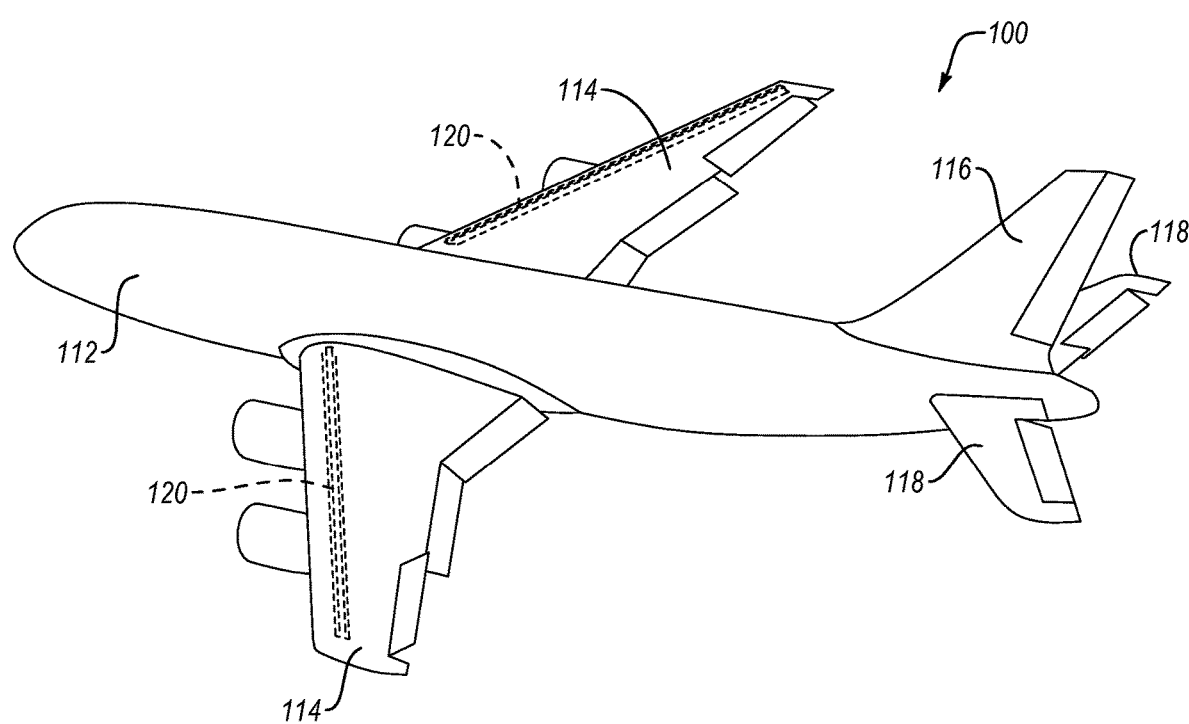
FIG. 1 is a perspective view of an aircraft, according to one or more examples of the present disclosure.

Referring to FIG. 1, one example of an aircraft 100 is shown. The aircraft 100 can be any of various types of aircraft, such as commercial aircraft used for the transportation of passengers, military aircraft for military operations, personal aircraft, and the like. As depicted, the aircraft 100 represents a passenger airplane. The aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116.

At least one of the above-mentioned components of the aircraft 100 is formed by securing an outer skin to a plurality of stringers. For example, as shown in FIG. 1, each of the wings 114 includes stringers 120 that are elongated in a spanwise direction (e.g., from wing root to wing tip) of the wings 114. The stringers 120 provide structure and strength to the component of which the stringers 120 form a part. Moreover, the stringers 120 help to transfer aerodynamic and bending loads acting on the components to underlining structural members, such as a frame, ribs, and spars. Although only one stringer 120 per wing 114 is shown, each wing 114 includes multiple stringers 120. Additionally, in some examples, the body 112, vertical stabilizer 116, and horizontal stabilizers 118 also includes multiple stringers, which can be similar to the stringers 120.

Figure 2:
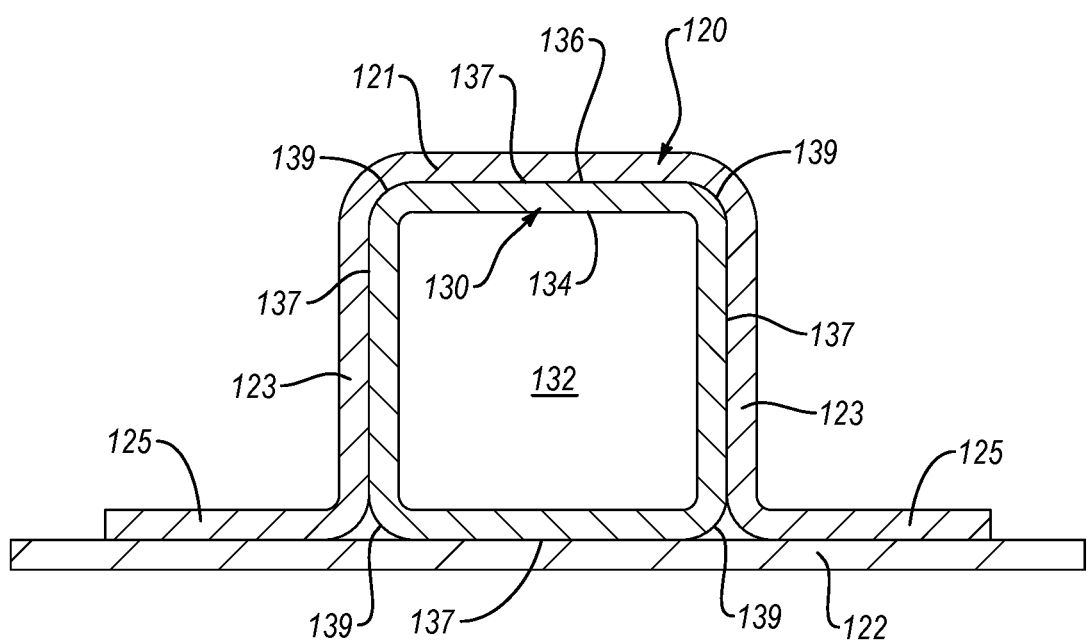
FIG. 2 is a cross-sectional side view of a hat stringer being formed, at least partially, by a hollow bladder, according to one or more examples of the present disclosure.

The stringer 120 can be any of various types of stringers. In the example of FIG. 2, the stringer 120 is a hat stringer. The stringer 120 includes a top wall 121, two side walls 123, and two flanges 125. The side walls 123 extend transversely from the top wall 121, to define an elongated channel of the stringer 120, and the flanges 125 extend transversely from the side walls 123 in opposite directions. The flanges 125 are used to attach the stringer 120 to other structural members of the aircraft 100. In some examples, a skin panel is attached to the top wall 121 of the stringer 120 to form a component of the aircraft 100.

According to some examples, the stringer 120 is made of a fiber-reinforced polymeric material, such as a carbon fiber reinforced epoxy (i.e., carbon fiber composite material) or glass fiber reinforced epoxy (e.g., fiber glass). In certain examples, the stringer 120 is formed by stacking plies of uncured fiber-reinforced polymeric material onto each other and curing the plies in place. To help form the plies of uncured fiber-reinforced polymeric material into a desired final shape of the stringer 120, a hollow bladder 130 is used. The hollow bladder 130 is shaped according to the desired final shape of the stringer 120. In certain examples, the hollow bladder 130 includes sides 137 and corners 139 forming the intersection of adjoining sides. The sides 137 are flat and the corners 139 are radiused in some examples. According to the illustrated example, the hollow bladder 130 includes four sides 137 and four corners 139 such that the hollow bladder 130 has a square-shaped cross-section along a plane perpendicular to a length of the hollow bladder 130. In such an example, the stringer 120 has a square-shaped or rectangular-shaped cross-section. However, in other examples, the hollow bladder 130 has fewer than four sides 137 and fewer than four corners 139 (e.g., three sides 137 and three corners 139 to define a triangular-shaped cross-section) or more than four sides 137 and more than four corners 139 to define a polygonal-shaped cross-section.

The hollow bladder 130 includes an interior surface 134 and an exterior surface 136, opposite the interior surface 134. The interior surface 134 is spaced apart from the exterior surface 136 by a thickness of the hollow bladder 130. The hollow bladder 130 further includes an interior cavity defined by the interior surface 134 of the hollow bladder 130.

Figure 8:
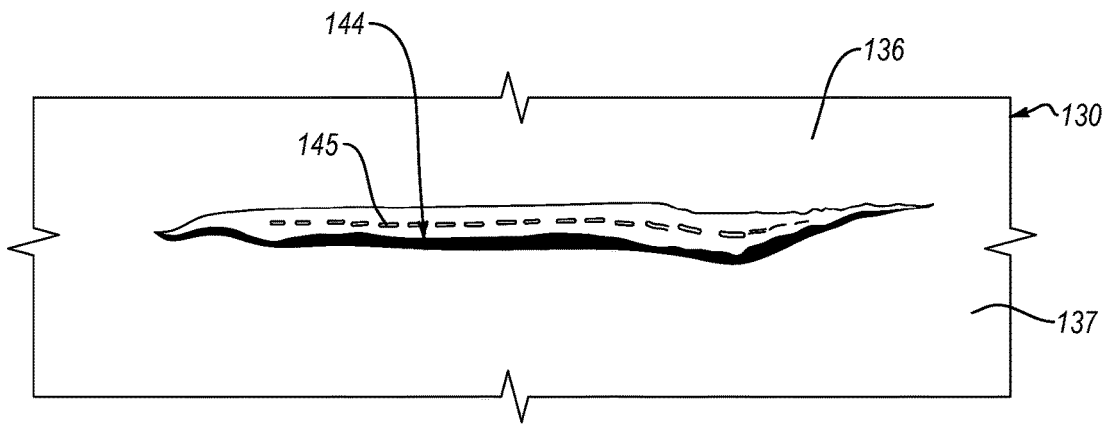
FIG. 8 is a top view of surface damage, in the form of a through-hole, in an exterior surface of a hollow bladder, according to one or more examples of the present disclosure.
Figure 26:
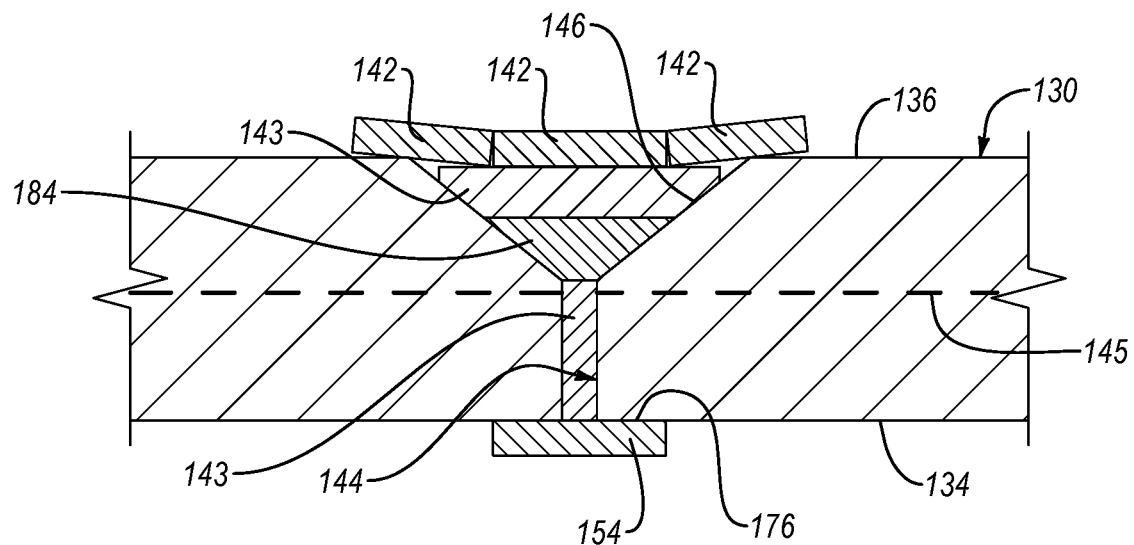
FIG. 26 is a cross-sectional side view of surface damage in a hollow bladder filled with a combination of strips of uncured elastomer and a strip of fiber-reinforced polymer, according to one or more examples of the present disclosure.
Figure 27:
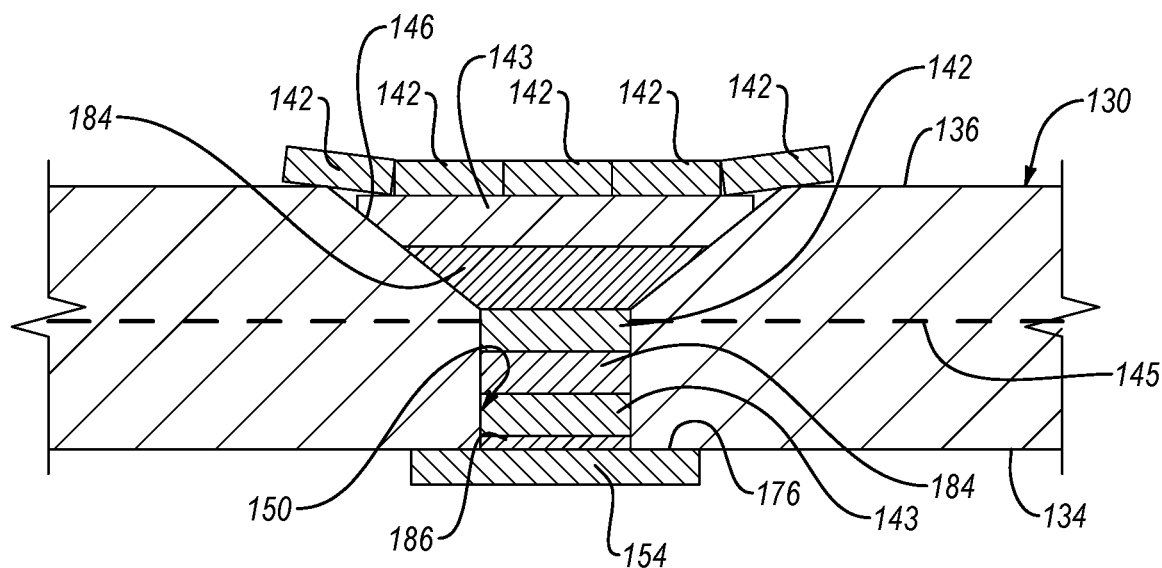
FIG. 27 is a cross-sectional side view of surface damage in a hollow bladder filled with a combination of strips of uncured elastomer and strips of fiber-reinforced polymer, according to one or more examples of the present disclosure.
Figure 28:
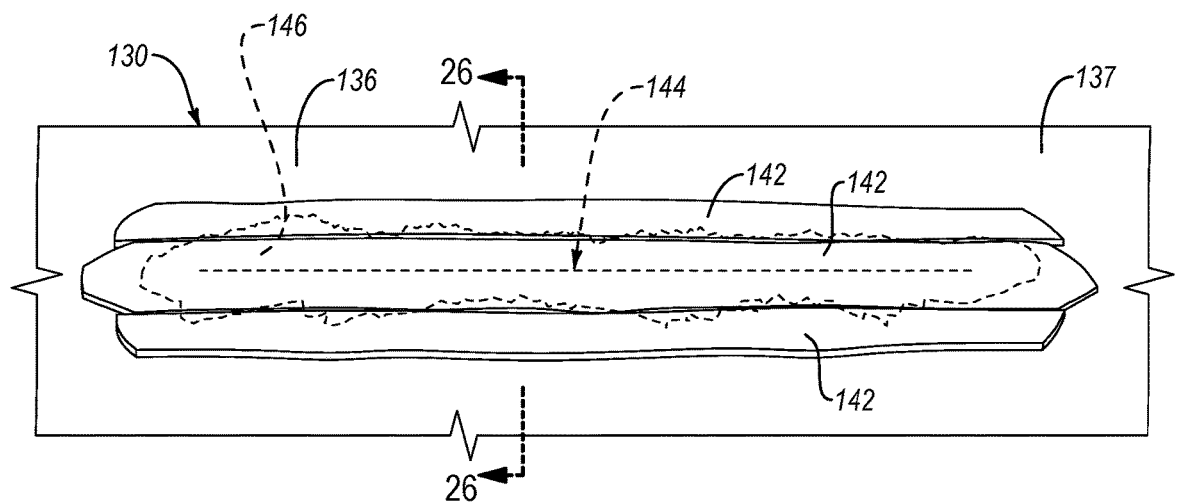
FIG. 28 is a top view of strips of uncured elastomer, in a side-by-side arrangement, entirely covering surface damage in an exterior surface of a hollow bladder, according to one or more examples of the present disclosure.
Figure 29:
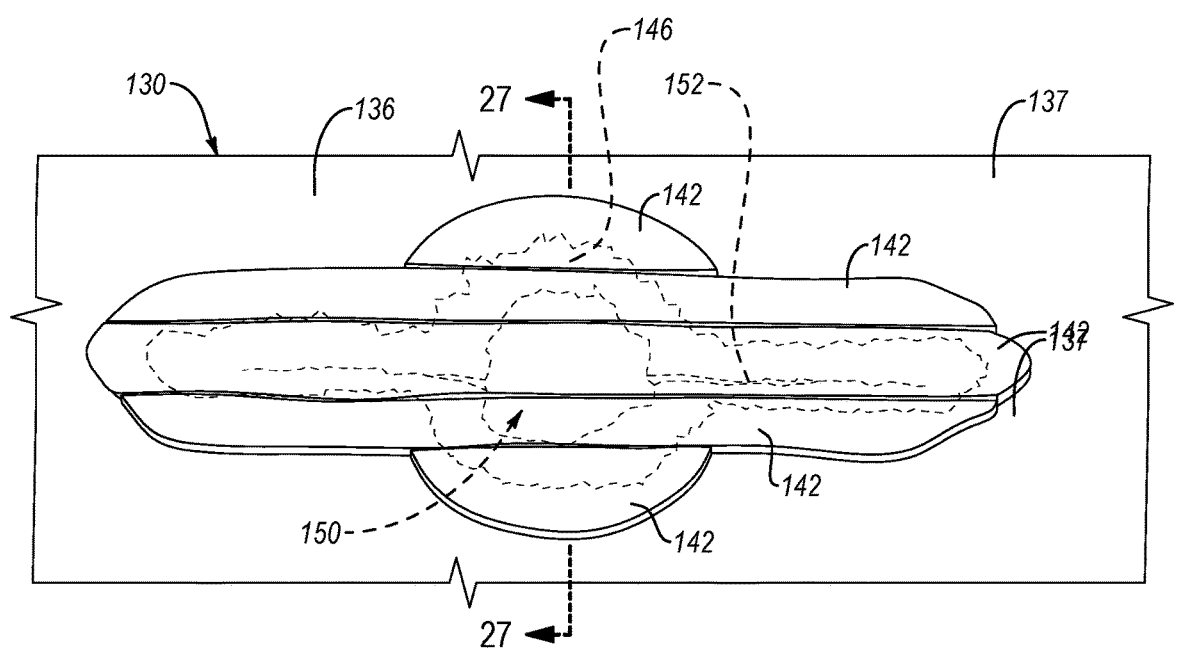
FIG. 29 is a top view of strips of uncured elastomer, in a side-by-side arrangement, entirely covering surface damage in an exterior surface of a hollow bladder, according to one or more examples of the present disclosure.

The hollow bladder 130 is made of a cured elastomer. Therefore, the hollow bladder 130 is made of a thermoset material that, when cured (or set), exhibits viscoelasticity. In other words, in some examples, the hollow bladder 130 is resiliently flexible under certain loads and permanently deformable under certain higher loads. According to an example, the hollow bladder 130 is made of a fluoroelastomer or a fluorocarbon-based synthetic rubber, such as FKM, perfluoro-elastomers, and tetrafluoro ethylene/propylene rubbers. FKM fluoroelastomeric materials include vinylidene fluoride as a monomer. In certain examples, the hollow bladder 130 is made of an FKM, such as Viton®, made by DuPont, Dai-El®, made by Daikin, Dyneon®, made by 3M, Tecnoflon®, made by Solvay Specialty Polymers, Elaftor®, made by HaloPolymer, and the like. Referring to FIGS. 8, 26, and 27, in some examples, the hollow bladder 130 includes a reinforcement layer 145, made of a fiber-reinforced polymer, such as fiberglass, embedded in the hollow bladder 130 to promote structural rigidity of the hollow bladder 130.

According to one method of forming the stringer 120, the plies of uncured fiber-reinforced polymeric material are first stacked onto and formed about the hollow bladder 130, using a platform 122 to support the hollow bladder 130 and stringer 120, as shown in FIG. 2. The hollow bladder 130 has a length at least equal to a desired length of the stringer 120. Accordingly, in some examples, the length of the hollow bladder 130 is between several feet and several hundred feet. The hollow bladder 130 and uncured plies are positioned in an autoclave and heated to a cure temperature of the uncured polymeric material of the plies, all while a pressure within the autoclave is increased to above atmospheric pressure. Because the interior cavity 132 of the hollow bladder 130 is hermetically sealed, the pressure in the interior cavity 132 is higher than the reduced pressure within the autoclave, which allows the hollow bladder 130 to retain its shape and maintain the desired shape of the stringer 120 while the stringer 120 is cured in the autoclave. A single hollow bladder 130 is usuable to form multiple stringers 120.

During use of the hollow bladder 130 to form the stringers 120, the exterior surface 136 may become damaged or worn. Alternatively, defects in the exterior surface 136 may be formed during the manufacturing of the hollow bladder 130. For example, referring to FIG. 3, surface damage 138 is formed into the exterior surface 136 of a side 137 of the hollow bladder 130. Alternatively, in another example, referring to FIG. 6, the surface damage 138 is formed into the exterior surface of a corner 139 of the hollow bladder 130. The surface damage 138 does not extend all the way through the hollow bladder 130. Even though the surface damage 138 may not be deep (e.g., superficial damage) or may not extend through the hollow bladder 130, the surface damage 138 can still negatively affect the formation of the stringer 120. As an example, even small imperfections in the exterior surface 136 of the hollow bladder 130 can lead to corresponding imperfections in the stringer 120, which may weaken or hamper the performance of the stringer 120. In some instances, during fabrication of the original hollow bladder 130 using a mold, gas trapped between the bladder and the mold may result in a valley on the surface of the bladder.

Figure 11:
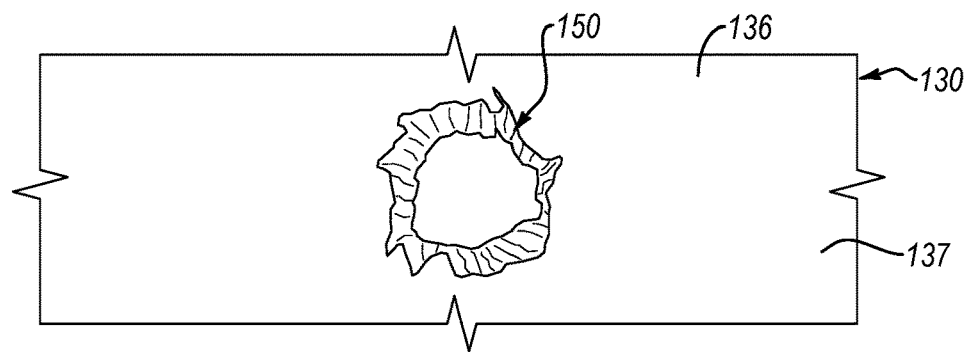
FIG. 11 is a top view of surface damage, in the form of a through-hole, in an exterior surface of a hollow bladder, according to one or more examples of the present disclosure.

More significant damage to the exterior surface 136 of the hollow bladder 130 can of course lead to more significant imperfections and even further weakening or hampering of the performance of the stringer 120. For example, referring to FIG. 8, the surface damage 144 is a narrow through-hole or through-slit extending entirely through the hollow bladder 130 from the exterior surface 136 to the interior surface 134. As another example, referring to FIG. 11, the surface damage 150 is a wide through-hole or puncture that extends entirely through the hollow bladder 130 from the exterior surface 136 to the interior surface 134.

The hollow bladder 130 is relatively expensive to manufacture. However, a hollow bladder 130 with significant surface damage in the exterior surface 136 of the hollow bladder 130 should not be used to make stringers. Traditionally, a hollow bladder with significant surface damage is scrapped, thus requiring manufacturing of a new hollow bladder as a replacement at significant cost. Described herein are methods of repairing surface damage in the exterior surface 136 of the hollow bladder 130 that allow a damaged hollow bladder 130 to be reused for the manufacture of stringers, which reduces labor and costs compared to traditional approaches.

According to one example, and referring to FIGS. 5, 7, 26-29, and 38, a method 300 of repairing surface damage, such as the surface damage 138 (see, e.g., FIG. 3), the surface damage 144 (see, e.g., FIG. 6), and the surface damage 150 (see, e.g., FIG. 11), in the exterior surface 136 of the hollow bladder 130 includes (block 302) placing first strips 142 at least partially within the surface damage in a side-by-side arrangement. Each one of the first strips 142 has a width W2 that is narrower than a width W1 of the surface damage. In one example, each one of the first strips 142 has a width W2 more than about half a width W1 of the surface damage. For example, a combined width W3 of the first strips 142 is greater than a width W1 of the surface damage. The first strips 142 are made of an uncured elastomer. In some examples, the elastomer of the first strips 142 is the same as the elastomer of the hollow bladder 130, except the elastomer of the first strips 142 is uncured and the elastomer of the hollow bladder 130 is cured. In other examples, the elastomer of the first strips 142 is different than the elastomer of the hollow bladder 130.

Referring to FIGS. 5, 7, and 26-29, in some examples, each one of the first strips 142 spans the surface damage from just outside the surface damage at one end of the surface damage to just outside an opposite end of the surface damage. For example, each of the first strips 142 has a length L2 that is longer than a length L1 of the surface damage 138 at the location where the first strip 142 is location over the surface damage 138. The portion of each one of the first strips 142 over the surface damage is at least partially within the surface damage. Placement of multiple first strips 142 in a side-by-side manner provides a narrow slit between the first strips 142, which facilitates the escape of air and other gasses from the repair site while the first strips 142 are cured. Without the narrow slit, such as if a single first strip 142 covered the entirety of the surface damage, air and other gasses would not be allowed to escape from the repair site. Moreover, the first strips 142, extending from just outside the surface damage, ensures the entirety of the surface damage is covered by the first strips 142. For example, as shown in FIGS. 5, 7, 28, and 29, the surface damage, shown in dashed line, is entirely contained within the total area of the first strips 142. As used herein, a single first strip 142 with a slit or slits extending along a length of the first strip 142 is considered two first strips 142 (e.g., the slit acts as a partition (or slits act as partitions) between two or more first strips 142 joined together at ends). To help maintain the placement of the first strips 142 relative to the surface damage during the repair process, in certain examples, acetone, or other solvent or adhesive, can be applied between portions (e.g., ends) of the first strips 142 and the exterior surface 136 of the hollow bladder 130.

The size and shape of the first strips 142 are dependent on the size and shape of the surface damage. For example, for narrow surface damage, such as the surface damage 138 of FIG. 3, two first strips 142 each having a long, slender, shape is sufficient to cover the surface damage 138 and overlap the exterior surface 136 of the hollow bladder 130 (see, e.g., FIG. 5). For wider surface damage, such as the surface damage 138 of FIG. 6, two first strips 142 can have a shorter, wider, shape to sufficiently cover the surface damage 138 (see, e.g., FIG. 7). For even wider surface damage, such as the surface damage 144 of FIG. 8 widened by a bevel 146 of FIG. 9, more than two first strips 142, in a side-by-side arrangement, are used to cover the surface damage 144 widened by the bevel 146 (see, e.g., FIG. 28). As another example of wider surface damage, such as the surface damage 150 of FIG. 11 lengthened by an artificial slit 152 and widened by a bevel 146 of FIG. 12, more than two first strips 142, with non-analogous shapes (e.g., three long-narrow first strips 142 and two short-wide first strips 142 flanking the three long-narrow first strips 142) in a side-by-side arrangement, are used to cover the surface damage 144 lengthened by the artificial slit 152 and widened by the bevel 146 (see, e.g., FIG. 29).

Figure 4:
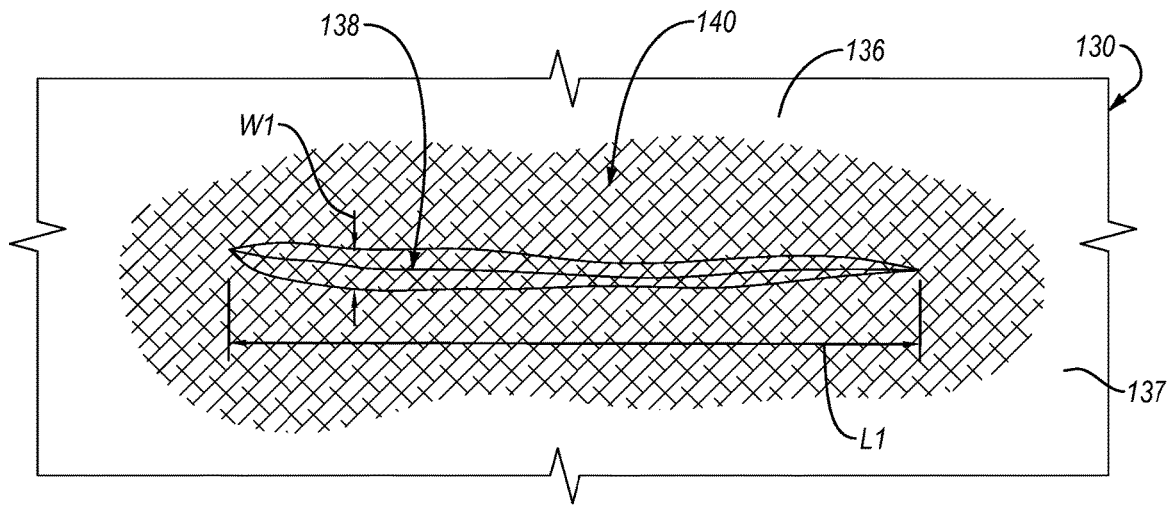
FIG. 4 is a top view of the surface damage of FIG. 3, with the surface damage and a portion of the exterior surface around the surface damage being scuffed, according to one or more examples of the present disclosure.
Figure 5:
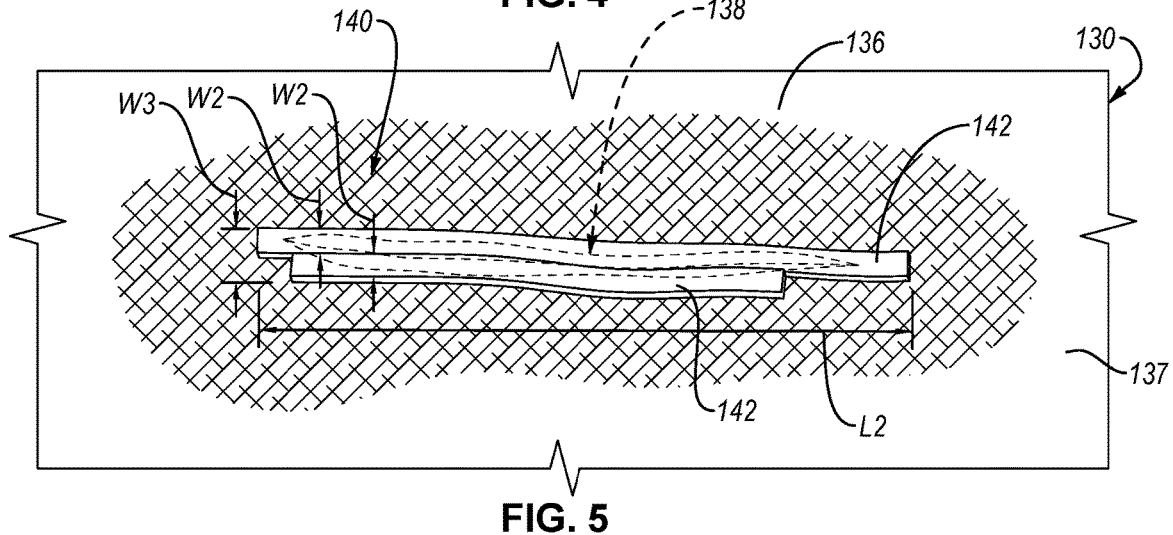
FIG. 5 is a top view of the surface damage of FIG. 4 and two strips within the surface damage, according to one or more examples of the present disclosure.
Figure 10:
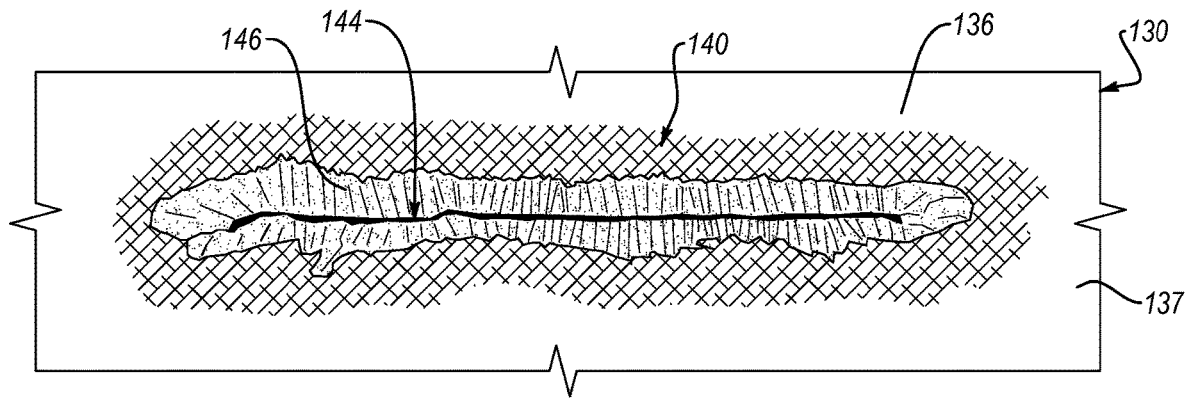
FIG. 10 is a top view of the surface damage and bevel of FIG. 9, with the surface damage, bevel, and a portion of the exterior surface around the bevel being scuffed, according to one or more examples of the present disclosure.
Figure 14:
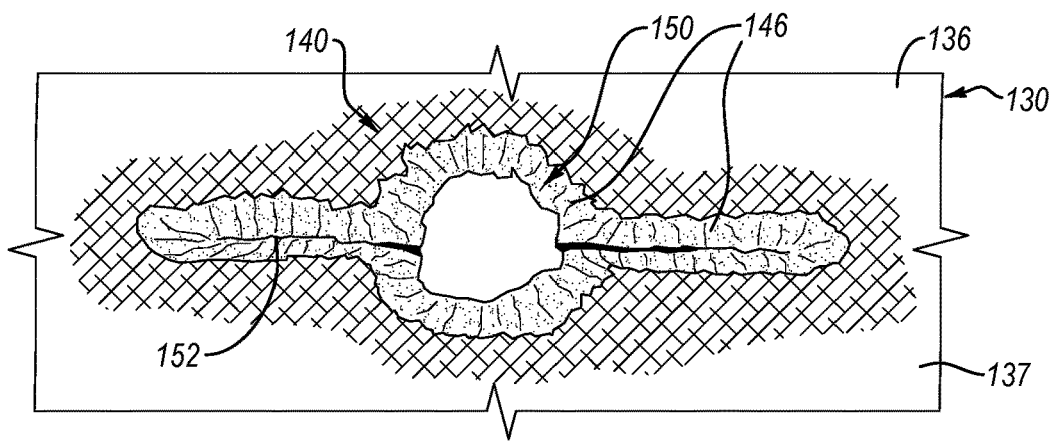
FIG. 14 is a top view of the surface damage and bevel of FIG. 13, with the surface damage, bevel, and a portion of the exterior surface around the bevel being scuffed, according to one or more examples of the present disclosure.

Prior to placing the first strips 142 at least partially within the surface damage, in some examples, as shown in FIGS. 4, 10, and 14, the method 300 further includes scuffing the surface damage and the exterior surface 136 of the hollow bladder 130, directly around the surface damage, to form a scuffed area 140. The scuffed area 140 includes the surface of the surface damage and a threshold amount of the exterior surface 136 surrounding the surface damage. In one example, the scuffed area 140 extends at least 0.25 inches away from the surface damage. The increased surface roughness in the scuffed area 140 promotes bonding of the first strips 142 with the hollow bladder 130 as the first strips 142 are cured. According to one example, the scuffed area 140 is created by scuffing the surface of the surface damage and the exterior surface 136 with an abrasive material, such as sandpaper, or an abrasive tool, such as a cone sander.

Figure 9:
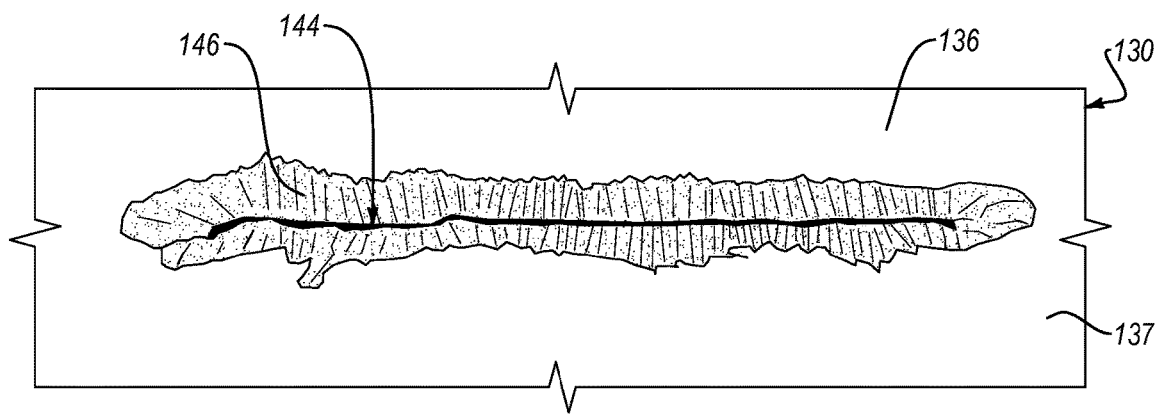
FIG. 9 is a top view of the surface damage of FIG. 8, with a bevel formed in the exterior surface around the surface damage, according to one or more examples of the present disclosure.
Figure 13:
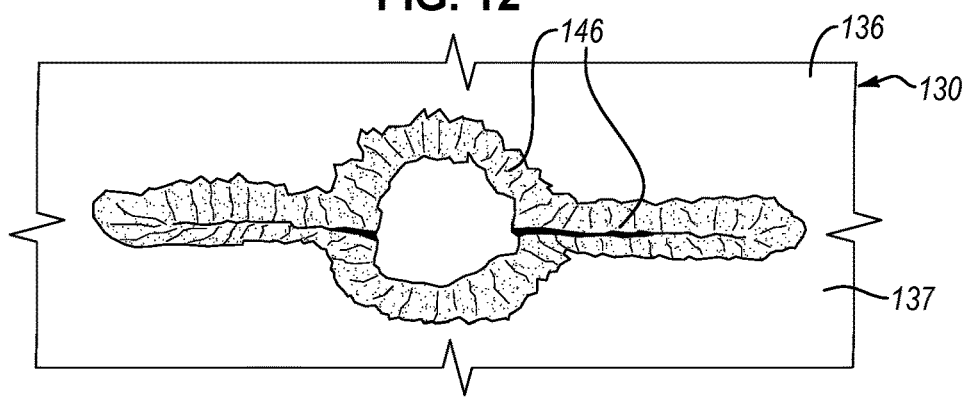
FIG. 13 is a top view of the surface damage of FIG. 12, with a bevel formed in the exterior surface around the surface damage, according to one or more examples of the present disclosure.

When the surface damage is a through-hole, such as the surface damage 144 and the surface damage 150, in some examples, prior to placing the first strips 142 at least partially within the surface damage and prior to scuffing the surface damage and the exterior surface 136 of the hollow bladder 130, the method 300 additionally includes forming a bevel 146 around a perimeter of the surface damage to, in effect, enlarge an upper portion of the surface damage (see, e.g., FIGS. 9 and 13). The bevel 146 helps to promote the strength of the repair, particularly at the ends of the surface damage, by providing additional surface area to which strips of uncured elastomer may bond during the repair process. The bevel 146 extends to a depth less than a thickness of the hollow bladder 130. In one example, the bevel 146 extends to a depth of about half a thickness of the hollow bladder 130. According to yet another example, the bevel 146 extends to, but not beyond, the reinforcement layer 145 of the hollow bladder 130. After the bevel 146 is formed, the surface of the bevel 146 can be scuffed during the formation of the scuffed area 140.

Figure 3:
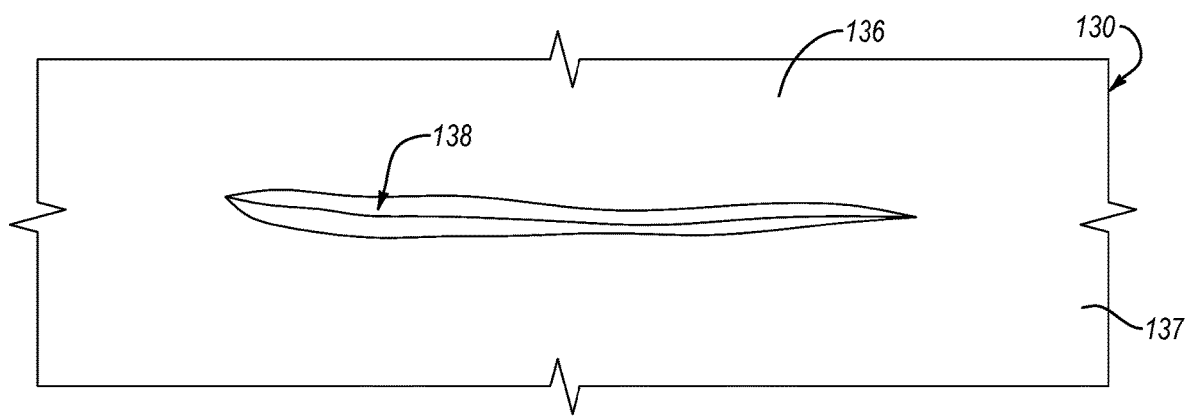
FIG. 3 is a top view of surface damage in an exterior surface of a flat side of a hollow bladder, according to one or more examples of the present disclosure.
Figure 6:
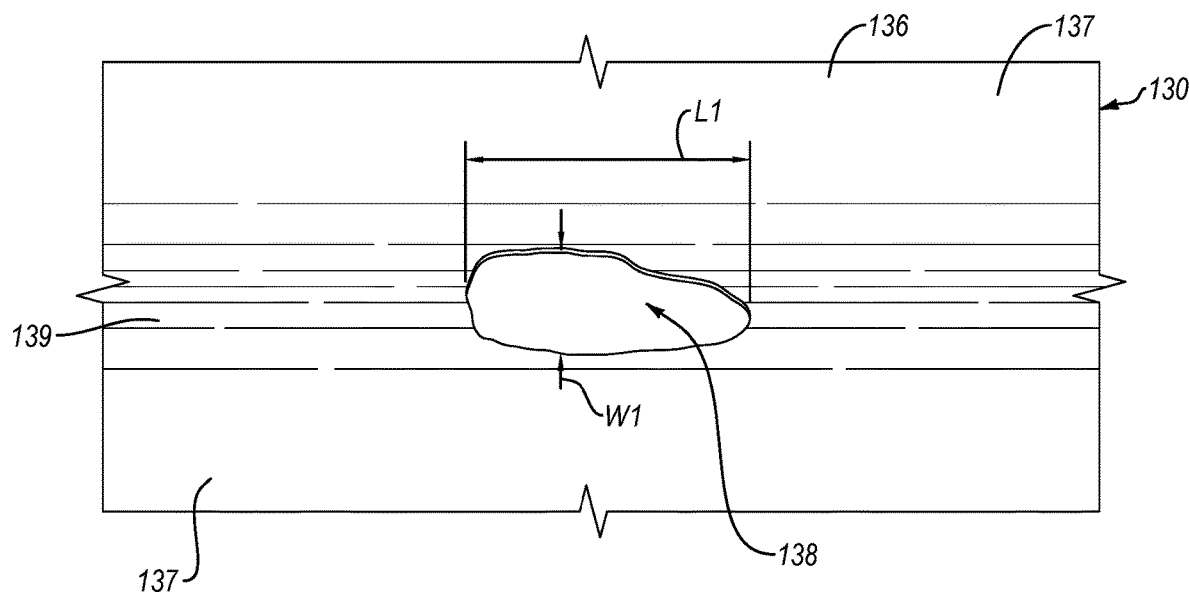
FIG. 6 is a top view of surface damage in an exterior surface of a corner of a hollow bladder, according to one or more examples of the present disclosure.
Figure 7:
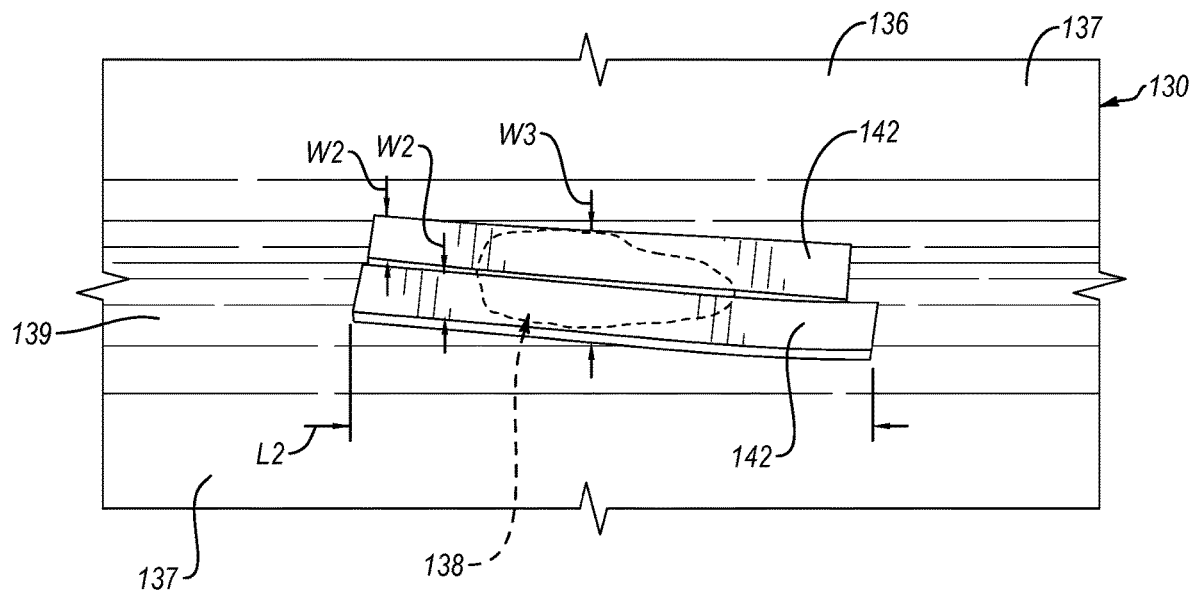
FIG. 7 is a top view of the surface damage of FIG. 6 and two strips within the surface damage, according to one or more examples of the present disclosure.

For shallow surface damage, such as surface damage 138 of FIGS. 3 and 6, that does not extend entirely through a thickness of the hollow bladder 130, after (block 302) placing the first strips 142 at least partially within the surface damage in a side-by-side arrangement, the first strips 142 are ready to be cured to bond the first strips 142 to the hollow bladder 130. Curing the first strips 142 requires a hermetic seal around the surface damage and the first strips 142. Accordingly, for deeper surface damage, such as surface damage 144 of FIG. 8 and the surface damage 150 of FIG. 11, that extends entirely through the thickness of the hollow bladder 130, to create a hermetic seal around the surface damage and the first strips 142, the surface damage must be sealed on the interior surface 134 of the hollow bladder 130. For this reason, in some examples where the surface damage is a through-hole, the method 300 further includes sealing the through-hole along the interior surface 134 of the hollow bladder 130 with a pressure-sensitive sealant tape 154 (see, e.g., FIGS. 15-24) before curing the first strips 142. Additionally, in such examples, the method 300 includes removing the pressure-sensitive sealant tape 154 from the interior surface 134 of the hollow bladder 130 after the first strips 142 are cured (see, e.g., FIG. 25).

Due to the increased depth of deeper surface damage, strips of uncured elastomer, as well as strips of other material in some instances, in addition to the first strips 142 may need to be placed within the surface damage to further fill the surface damage with repair material and promote bonding between elastomeric materials of the hollow bladder 130 and the repair material along the entire depth of the surface damage. Accordingly, referring to FIGS. 26 and 27, in some examples the method 300 additionally includes placing second strips 143, made of the uncured elastomer of the first strips 142, at least partially or entirely within the surface damage in a stacked arrangement such that the second strips 143 are interposed between the first strips 142 and the interior cavity of the hollow bladder 130. When the hollow bladder 130 includes a reinforcement layer 145, in some examples, the method 300 additionally includes placing one or more third strips 184, made of a fiber-reinforced polymer (and coated with an uncured elastomer in some examples), at least partially or entirely within the surface damage between the second strips 143. The fiber-reinforced polymer of the third strip(s) 184 is the same as the fiber-reinforced polymer of the reinforcement layer 145. Additionally, in some examples, the thickness and/or quantity of the second strips 143 is selected such that at least one third strip 184 is at least partially aligned, or co-planar, with the reinforcement layer 145. The stacking arrangement of second strips 143 and third strips 184 is dependent on the width of the through-portion of the surface damage. The third strips 184 help to reduce the occurrence of air bubbles during curing of the first strips 142 and the second strips 143.

Referring to FIG. 26, according to one example, when the surface damage is a narrow through-slit, such as the surface damage 144, a second strip 143 is placed vertically within the portion of the narrow through-slit not widened by the bevel 146. The vertically-oriented second strip 143 is configured to fill the portion of the narrow through-slit not widened by the bevel 146. Therefore, in one example, a thickness of the vertically-oriented second strip 143 is selected to fill the gap defined by the narrow through-slit not widened by the bevel 146 and a width of the vertically-oriented second strip 143 is selected to be approximately equal to a height of the narrow through-slit not widened by the bevel 146. In other examples, multiple second strips 143 can be used to fill the narrow through-slit not widened by the bevel 146. A third strip 184 is placed within the surface damage directly over the vertically-oriented second strip 143. The third strip 184 is shaped to fill the space defined by the bevel 146 at the location of the third strip 184. Moreover, the third strip 184 can be beveled to complement the bevel 146. A second strip 142 is placed within the surface damage directly over the third strip 184, such that this second strip 142 is interposed between the first strips 142 and the third strip 184. In this manner, the third strip 184 is interposed between the second strips 143. The second strip 142, placed directly over the third strip 184, is shaped to fill the space defined by the bevel 146 at the location of this second strip 142. The second strip 142, placed in the space defined by the bevel 146 can be beveled to complement the bevel 146. The first strips 142 are then placed onto the stacked configuration of the second strips 143 and the third strip 184.

Referring to FIG. 27, according to one example, when the surface damage is a wide through-hole, such as the surface damage 150, stacks of horizontally-oriented strips are placed within the portion of the wide through-hole not widened by the bevel 146 or lengthened by the slit 152. In the illustrated example, the horizontally-oriented strips include two second strips 143 and a third strip 184 between the two second strips 143. The second strips 143 and the third strip 184 are sized and shaped to collectively fill the portion of the wide through-hole not widened by the bevel 146 or lengthened by the slit 152. Therefore, in one example, a width of the horizontally-oriented second strips 143 and third strip 184 is selected to be approximately equal to a width of the wide through-hole. According to some examples, fewer or more than two second strips 143 and/or more than one third strip 184 can be stacked in the wide through-hole. A third strip 184 is placed within the surface damage directly over the horizontally-oriented strips in the wide through-hole. Additionally, a second strip 142 is placed within the surface damage directly over the third strip 184, such that this second strip 142 is interposed between the first strips 142 and the third strip 184 above the wide through-hole. In this manner, each of the two third strips 184 is interposed between a corresponding two of the second strips 143. In other words, each one of the third strips 184 is sandwiched between a respective two of the second strips 143. Accordingly, in the illustrated example, the stacked arrangement of strips includes alternating layers of second strips 143 and third strips 184. The first strips 142 are then placed onto the stacked configuration of the second strips 143 and the third strips 184.

As shown in FIG. 27, in certain examples, the method 300 further includes placing a release film 186 at least partially or entirely within the wide through-hole, such as with the surface damage 150, between the second strips 143 in the wide through-hole and the pressure-sensitive sealant tape 154 adhered to the interior surface 134 of the hollow bladder 130. The release film 186 helps to prevent adhesion between the pressure-sensitive sealant tape 154 and the second strip 143 at the bottom of the wide through-hole. As described below, the release film 186 is configured to peel away from the second strip 143 as the pressure-sensitive sealant tape 154 is peeled away from the interior surface 134 of the hollow bladder 130 following curing of the strips of uncured elastomer. In one example, the release film 186 is a thermoplastic release film or a high temperature and high elongation release film, such as Teflon® film or a fluoropolymer (FEP) release film (e.g., A4000 release film made by Airtech International Inc.).

Figure 33:
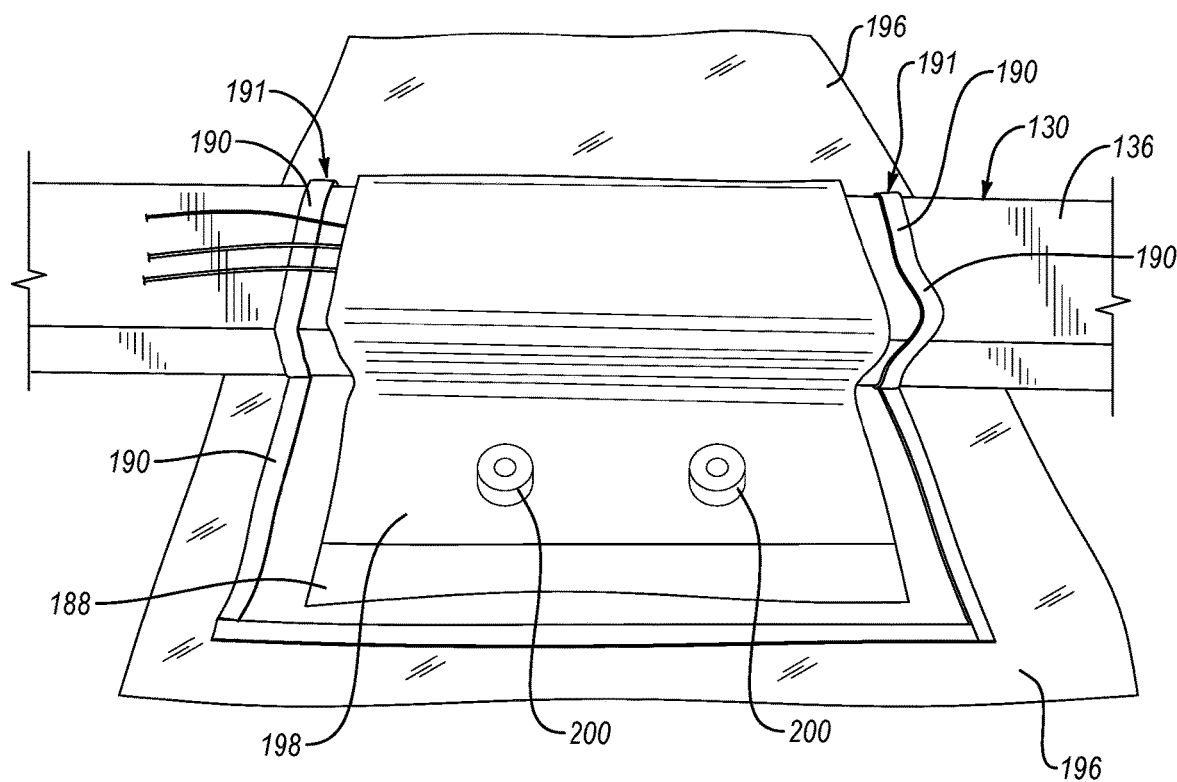
FIG. 33 is a perspective view of the hollow bladder of FIG. 33, from above the hollow bladder and with a woven polyester ply placed onto the heating blanket, according to one or more examples of the present disclosure.
Figure 36:
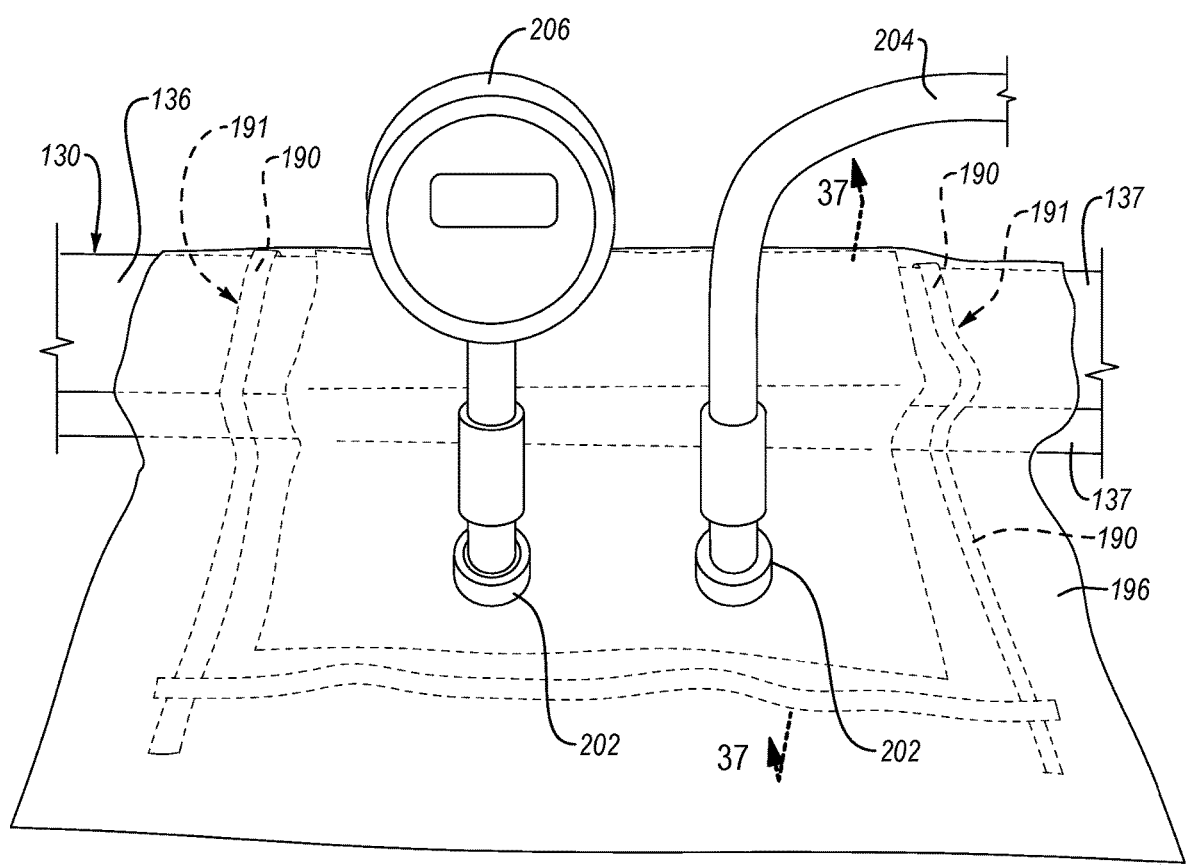
FIG. 36 is a perspective view of the hollow bladder of FIG. 33, from above the hollow bladder with a vacuum bag enclosing the peel ply, caul plate assembly, heating blanket, woven polyester ply, and surface damage, according to one or more examples of the present disclosure.
Figure 37:
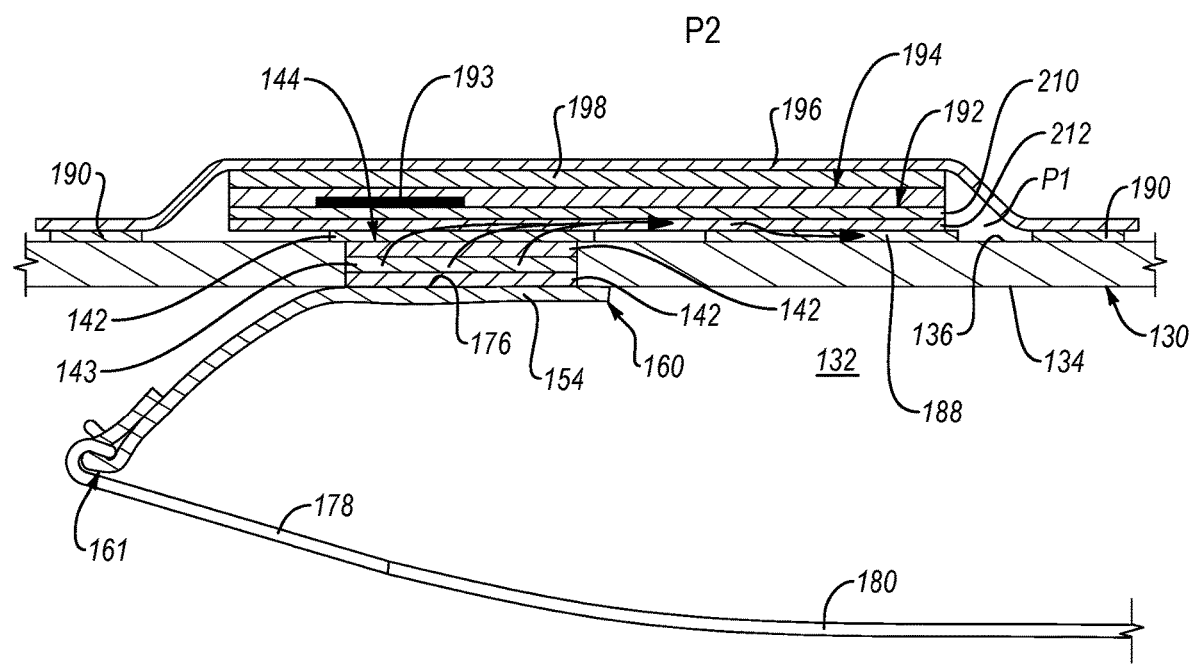
FIG. 37 is a cross-sectional front view of a hollow bladder, with surface damage in an exterior surface of the hollow bladder, in the form of a through-hole, sealed on an exterior side and an interior side of the hollow bladder, according to one or more examples of the present disclosure.
Figure 38:
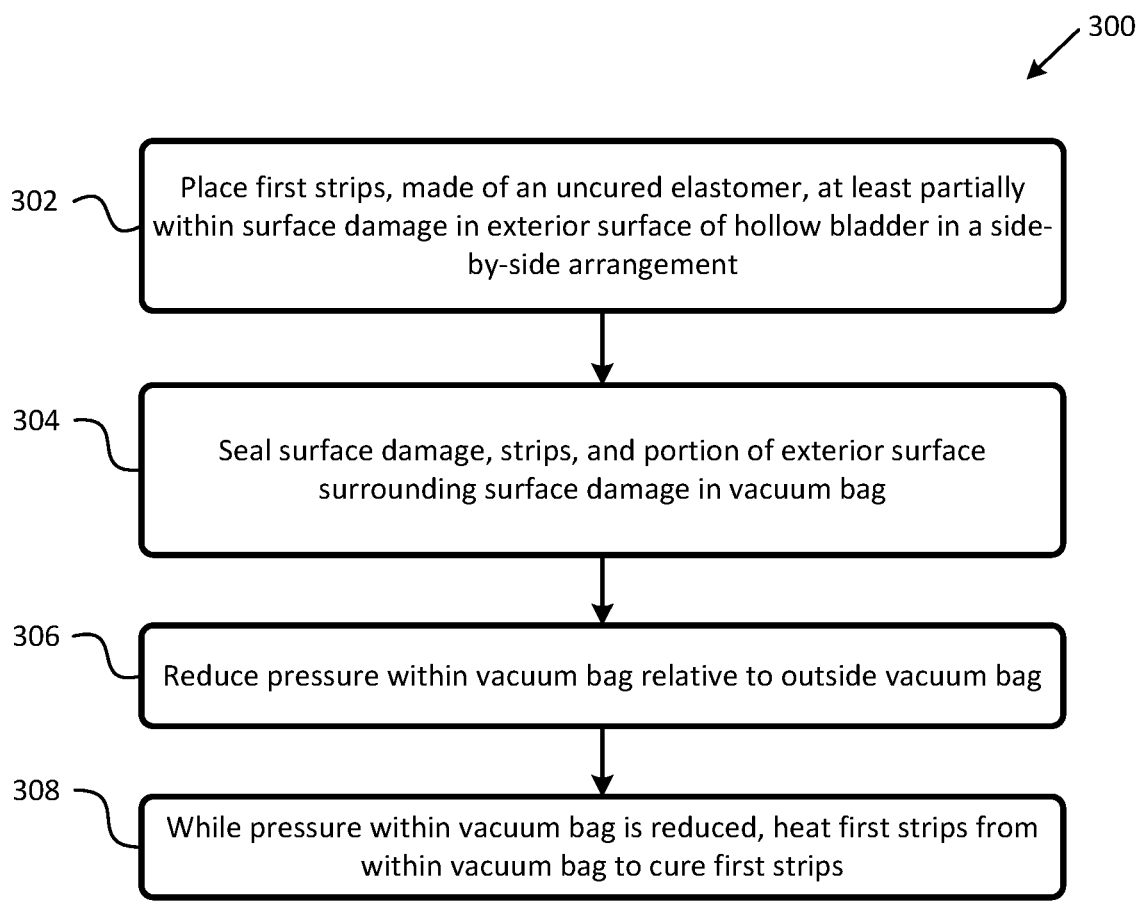
FIG. 38 is a schematic flow chart of a method of repairing surface damage in an exterior surface of a hollow bladder, according to one or more examples of the present disclosure.

Referring again to FIG. 38, in some examples, after (block 302) placing the first strips 142 at least partially within the surface damage in the side-by-side arrangement, and after filling the surface damage with additional strips and sealing the surface damage on the interior surface 134 of the hollow bladder 130 if the surface damage is a through-hole, the method 300 additionally includes (block 304) sealing the surface damage, at least the first strips 142, and a portion of the exterior surface 136 surrounding the surface damage in a vacuum bag 196 (see, e.g., FIGS. 33, 36, and 37). In one example, the vacuum bag 196 is formed by wrapping a single sheet of material around the portion of the hollow bladder 130 containing the surface damage and securing two opposing sides of the single sheet to each other to enclose the vacuum bag 196 and seal the surface damage in the vacuum bag 196.

As shown in FIGS. 31, 33, 36, and 37, according to one example, the surface damage, the first strips 142, and the portion of the exterior surface 136 surrounding the surface damage are sealed in the vacuum bag 196 by applying pressure-sensitive sealant tape 190 onto the exterior surface 136 of the hollow bladder 130 and adhering the vacuum bag 196 to the pressure-sensitive sealant tape applied onto the exterior surface 136. The pressure-sensitive sealant tape 190 is applied onto the exterior surface 136 of the hollow bladder 130 to form a ring 191 of pressure-sensitive tape 190 on each side of the surface damage. Each ring 191 of pressure-sensitive sealant tape 190 extends around an entirety of the circumference of the hollow bladder 130. The rings 191 help form a hermetic seal between a layer of the vacuum bag 196 and the hollow bladder 130. In some examples, sealing the surface damage, the first strips 142, and the portion of the exterior surface 136 surrounding the surface damage in the vacuum bag 196 further includes sealing the vacuum bag 196 onto itself using a strip of pressure-sensitive tape 190 between two opposing sides of the vacuum bag 196. The strip of pressure-sensitive tape 190 extends continuously from one of the rings 191 to the other of the rings 191. In this manner, a single sheet is formed into the vacuum bag 196 according to one example. The vacuum bag 196 is formed from a sheet of Nylon or other synthetic non-permeable polymeric material having a desired thickness, such as at least 3.0 millimeters.

After (block 304) sealing the surface damage, the first strips 142, and the portion of the exterior surface 136 surrounding the surface damage in the vacuum bag 196, the method 300 includes (block 306) reducing pressure within the vacuum bag 196 (e.g., P1 of FIG. 37) relative to outside the vacuum bag 196 (e.g., P2 of FIG. 37). It is recognized that reducing pressure within the vacuum bag 196 relative to outside the vacuum bag 196, in effect, increases the external pressure applied by the bag to the repair area of the hollow bladder 130 and thus to the first strips 142. Additionally, while the pressure within the vacuum bag 196 is reduced, the method 300 includes (block 308) heating the first strips 142 from within the vacuum bag 196 to cure the first strips 142. The reduction in pressure and curing the first strips 142 promotes bonding of the elastomeric material of the first strips 142 with the elastomeric material of the hollow bladder 130. In effect, locally sealing the surface damage and the first strips 142, locally reducing the pressure around the surface damage, and locally heating the first strips 142 in this manner creates a localized autoclave just around the surface damage to repair the surface damage. Accordingly, the entire hollow bladder 130 need not be relocated into an autoclave to repair the surface damage.

In some examples, curing the first strips 142, and optionally the second strips 143 and one or more third strips 184, to repair surface damage in the exterior surface 136 of the hollow bladder 130 needs a method of heating the repair site and removing heat and gasses away from the repair site. Accordingly, before (block 304) sealing the surface damage, the first strips 142, and a portion of the exterior surface 136 surrounding the surface damage in a vacuum bag 196, in such examples, the method 300 includes additional steps to facilitate heating and removal of heat and gasses away from the repair site.

Figure 30:
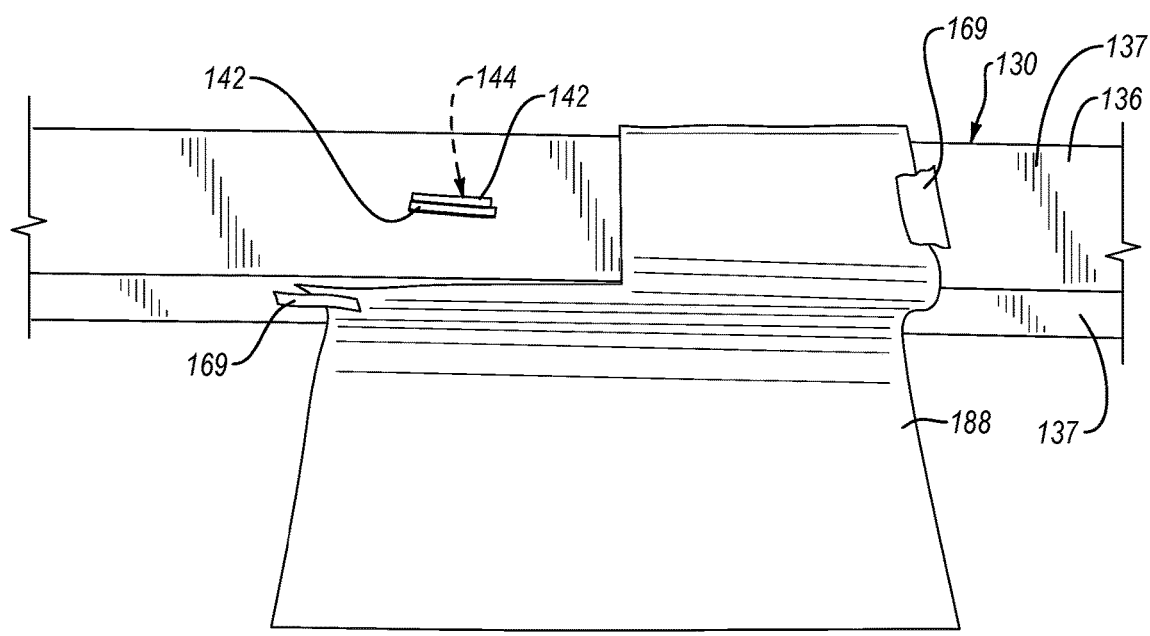
FIG. 30 is a perspective view of a hollow bladder, from above the hollow bladder and with a peel ply applied onto a portion of an exterior surface of the hollow bladder, according to one or more examples of the present disclosure.

In one example, as shown in FIGS. 30 and 37, the method 300 additionally includes applying a peel ply 188 onto the exterior surface 136 of the hollow bladder 130 away from the surface damage 144 in the exterior surface 136. The peel ply 188 does not cover the surface damage 144, but is, in effect, applied onto the exterior surface 136 around the surface damage 144. For example, the peel ply 188 can include a cut-out within which the surface damage 144 is located. In this manner, the peel ply 188 is in direct contact with the exterior surface 136 of the hollow bladder 130, while allowing the surface damage 144 to remain uncovered. According to one implementation, the peel ply 188 is shaped such that a gap of at least 1-2 inches is between the surface damage 144 and the peel ply 188. For surface damage 144 with a shorter length, such as less than about twelve inches, the peel ply 188 covers the exterior surface 136 on only one side of the side 137 in which the surface damage 144 is formed. In contrast, for surface damage 144 with a longer length, such as equal to or more than about twelve inches, the peel ply 188 covers the exterior surface 136 on both sides of the side 137 in which the surface damage 144 is formed. The peel ply 188 is long enough to wrap around a vertical side 137, perpendicular to the side 137 in which the surface damage 144 is formed, and onto a support surface. In some examples, the peel ply 188 is secured in place by tape.

Figure 31:
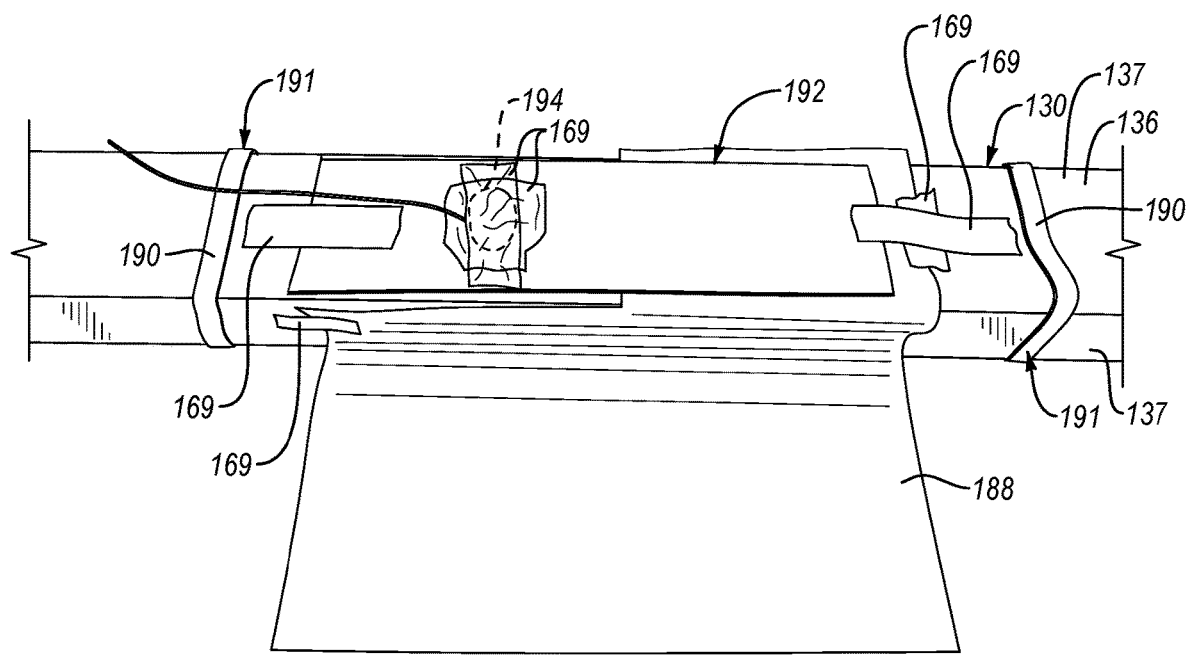
FIG. 31 is a perspective view of the hollow bladder of FIG. 30, from above the hollow bladder and with a caul plate assembly placed over surface damage in the exterior surface of the hollow bladder and onto the peel ply, according to one or more examples of the present disclosure.

Referring to FIGS. 31 and 37, according to one example, the method 300 additionally includes placing a caul plate assembly 192 onto the exterior surface 136 over an entirety of the surface damage in the exterior surface 136 and onto the peel ply 188. Accordingly, the caul plate assembly 192 is longer than a length of the surface damage 144 and wider than a width of the surface damage 144. The caul plate assembly 192 includes a caul plate 210 and a breathable release film 212 on at least one side of the caul plate 210. The caul plate 210 is made of a metal material with a high thermal conductivity, such as aluminum, copper, and the like. The breathable release film 212 is made of any of various tapes having a textured surface, such as TP100SEC or TP100S tape. The caul plate assembly 192 is placed onto the exterior surface 136 and the peel ply 188 such that the breathable release film 212 is interposed between the surface damage and the caul plate 210 and the breathable release film 212 is interposed between the peel ply 188 and the caul plate 210. The caul plate assembly 192 can be taped in place.

Figure 34:
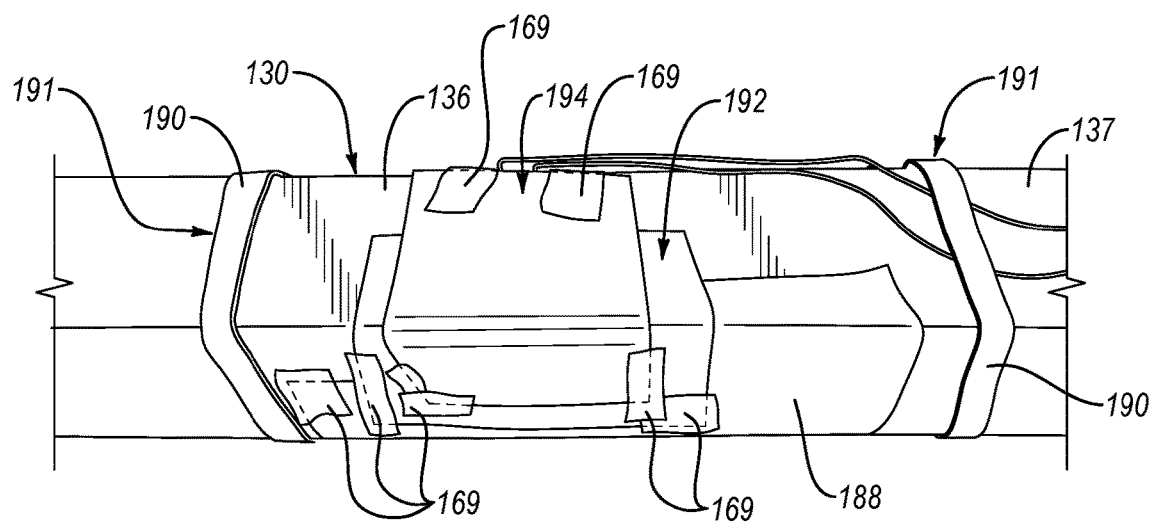
FIG. 34 is a perspective view of a hollow bladder, from above the hollow bladder and with a heating blanket placed onto a caul plate assembly, according to one or more examples of the present disclosure.

As shown in FIGS. 31 and 37, when the surface damage 144 is in a flat side 137 of the hollow bladder 130, the caul plate 210 is flat and single planed. However, when the surface damage 144 is in a corner 139 of the hollow bladder 130, as shown in FIG. 34, the caul plate of the caul plate assembly 192 is bent to wrap around the corner 139 and sit flush against the exterior surface 136 defining the corner 139.

Referring to FIG. 31, according to one example, the method 300 additionally includes securing, such as with tape or glue, a thermocouple onto the caul plate 210 after the caul plate assembly 192 is placed onto the exterior surface 136 of the hollow bladder 130.

Figure 32:
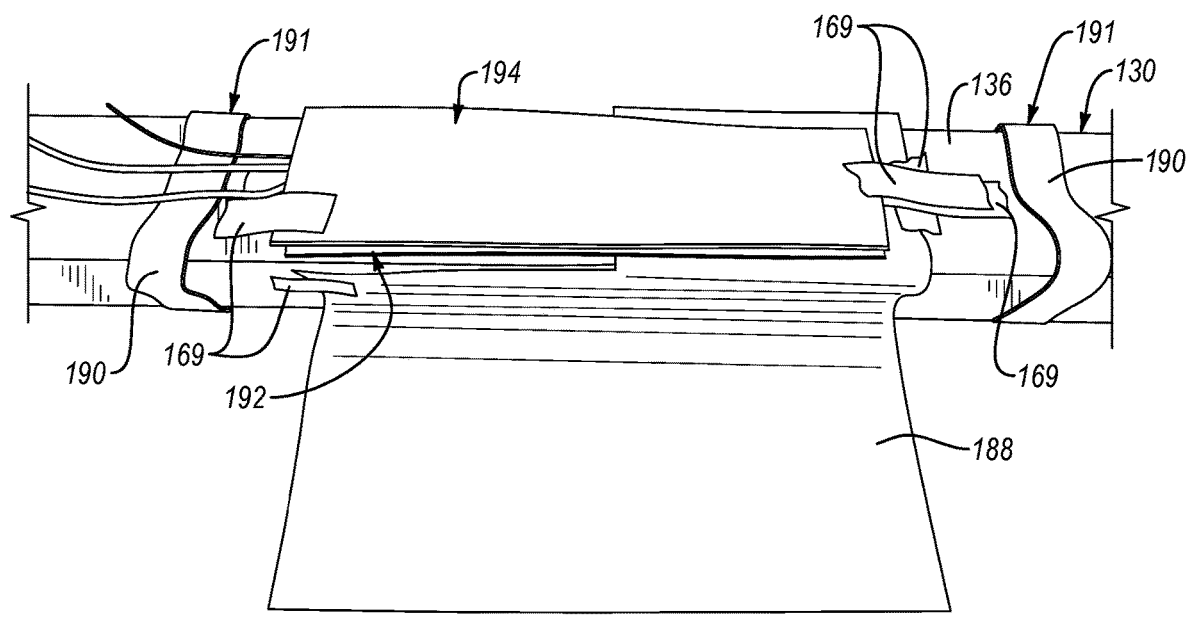
FIG. 32 is a perspective view of the hollow bladder of FIG. 31, from above the hollow bladder and with a heating blanket placed onto the caul plate assembly, according to one or more examples of the present disclosure.

Now referring to FIGS. 32 and 37, the method 300 also includes placing a heating blanket 194 onto the caul plate assembly 192 in some examples. The heating blanket 194 is longer and wider than the surface damage 144 and is placed such that the heating blanket 194 covers an entirety of the surface damage 144. The heating blanket 194 can be taped in place. To allow the wires of the heating blanket 194 and the thermocouple 193 to pass outside of the vacuum bag 196, while maintaining the seal of the vacuum bag 196, a second strip of pressure-sensitive sealant tape 190 can be applied onto the pressure-sensitive sealant tape 190 on the hollow bladder 130 or on the vacuum bag 196 and the wires can be sealed between the two strips of pressure-sensitive sealant tape 190.

Figure 35:
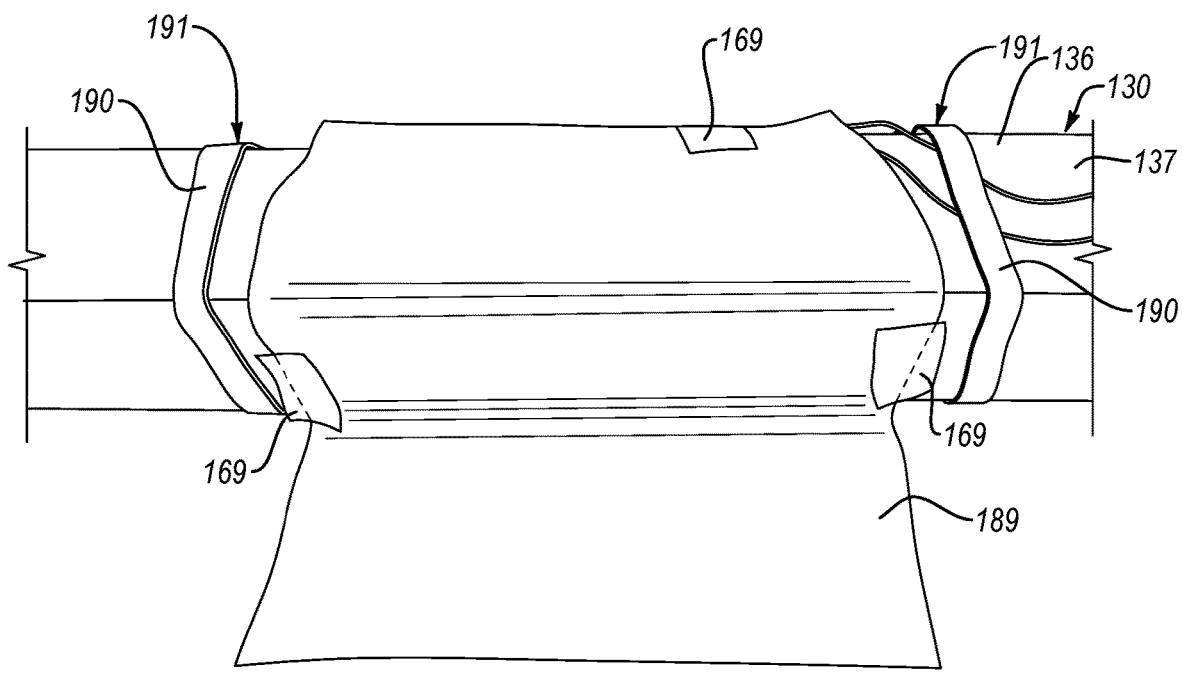
FIG. 35 is a perspective view of the hollow bladder of FIG. 34, from above the hollow bladder and with a secondary peel ply placed onto the caul plate assembly and the heating blanket, according to one or more examples of the present disclosure.

As shown in FIG. 35, in some examples, such as those with the surface damage 144 in the corner 139 of the hollow bladder 130 and a bent or curved caul plate assembly 192, the method 300 additionally includes applying a secondary peel ply 189 onto the heating blanket 194 such that the heating blanket 194 is interposed between the secondary peel ply 189 and the caul plate assembly 192. The secondary peel ply 189 is long enough to wrap around a horizontal and vertical side 137 and onto a support surface. In some examples, the secondary peel ply 189 is secured in place by tape.

Referring to FIGS. 33 and 37, in certain examples, the method 300 further includes placing a woven polyester ply 198 onto the heating blanket 194 such that the woven polyester ply 198 is interposed between the heating blanket 194 and the vacuum bag 196. The woven polyester ply 198 entirely covers the heating blanket 194 to prevent the heating blanket 194 from being in direct contact with the vacuum bag 196. In some examples, as shown, the woven polyester ply 198 is large enough to also cover the excess portion of the peel ply 188 not covering the hollow bladder 130. In one example, the woven polyester ply 198 is a nylon fiber breather and/or has a weight of at least 10 ounces per square yard. The woven polyester ply 198 can be secured in place by tape. In some examples, any one or more of the layers coupled to the hollow bladder 130 can be held in place with tape 169.

Again referring to FIG. 33, in some examples, the method 300 includes positioning vacuum port bases 200 on the woven polyester ply 198 at a location away from the hollow bladder 130. In other words, the vacuum port bases 200 are not placed on the hollow bladder 130, but on the low flap or extension of the woven polyester ply 198 extending away from the hollow bladder 130. The vacuum port bases 200 can be spaced apart as shown. In some instances, the vacuum ports 200 are taped in place.

After the vacuum port bases 200 are in place on the woven polyester ply 198, as shown in FIG. 36, the vacuum bag 196 is formed as described above. Once formed, the vacuum bag 196 seals the peel ply 188, the caul plate assembly 192, the heating blanket 194, the woven polyester ply 198, the secondary peel ply 189 (if used), and the vacuum ports 200, in addition to the surface damage 144, the first strips 142, the portion of the exterior surface 136 surrounding the surface damage 144, and any second strips 143 and third strips 184.

Referring to FIG. 36, the method 300 additionally includes forming holes in the vacuum bag 196 over the vacuum port bases 200 and intercoupling vacuum port nozzles 202 to respective vacuum port bases 200 through respective holes formed in the vacuum bag 196. Next, the method 300 includes coupling a vacuum gauge 206 to one of the vacuum port nozzles 202 and coupling a vacuum hose 204 to another one of the vacuum port nozzles 202. The vacuum gauge 206 is operable to determine a pressure within the vacuum bag 196. The vacuum hose 204 is fluidly coupled to a pump (not shown) operable to reduce the pressure in the vacuum bag 196. According to some examples, the output of the thermocouple 193 and the input to the heating blanket 194 is coupled to a hot bonder or other control device. The hot bonder is operable to control the heating blanket 194 to heat the first strips 142, and the second strips 143 if applicable, according to a predetermined cure program while the pressure is reduced in the vacuum bag 196. In one example, the hot bonder is operable to perform block 308 of the method 300 by heating the first strips 142, and the second strips 143 if applicable, according to the cure program of block 506 of the method 500 of FIG. 40. In one example, prior to heating the first strips 142 and the second strips 143, the vacuum bag 196 is tested to ensure the vacuum bag 196 is capable of reaching and maintaining a threshold pressure, such as, for example, 24 inHg. If the vacuum bag 196 passes the pressure test, then the method 300 proceeds to heat the first strips 142 and the second strips 143 according to block 308. Referring to FIG. 37, as strips of uncured elastomer are cured, curing gasses are able to escape the repair site through the breathable release film 212 of the caul plate assembly 192 and through the peel ply 188 as indicated by directional arrows. The method 300 may include surface finishing the cured strips and surrounding area on the exterior surface 136 of the hollow bladder 130.

Figure 39:
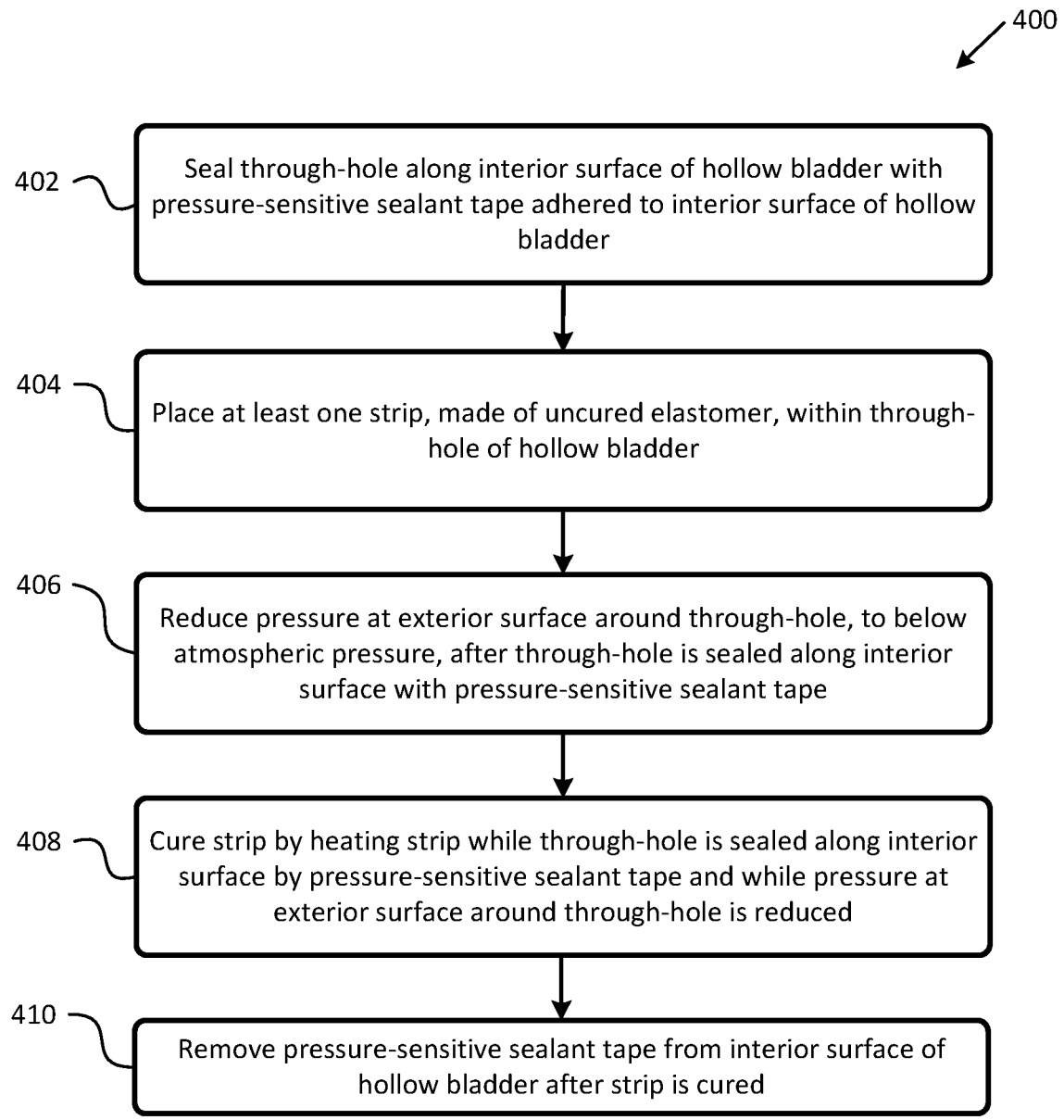
FIG. 39 is a schematic flow chart of a method of repairing a through-hole a hollow bladder, according to one or more examples of the present disclosure.

Referring to FIG. 39, according to some examples, disclosed herein is a method 400 of repairing surface damage in the hollow bladder 130 where the surface damage is a through-hole. For example, the surface damage can be the surface damage 144 or the surface damage 150. The method 400 includes (block 402) sealing the through-hole along the interior surface 134 of the hollow bladder 130 with the pressure-sensitive sealant tape 154 adhered to the interior surface 134 of the hollow bladder 130, which, in some examples, can be performed as described above in association with the method 300. The method 400 includes steps analogous to some of the steps of the method 300. For example, the method 400 includes (block 404) placing at least one strip 142 within the through-hole of the hollow bladder 130, which, in some examples, can be performed as described above in association with block 302 of the method 300. The method 400 also includes (block 406) reducing a pressure at the exterior surface 136 of the hollow bladder 130 around the through-hole, to below atmospheric pressure, after the through-hole is sealed along the interior surface 134 with the pressure-sensitive sealant tape 154, which, in some examples, can be performed as described above in association with block 306 of the method 300. The method 400 further includes (block 408) curing the at least one strip 142 by heating the at least one strip 142 while the through-hole is sealed along the interior surface 134 by the pressure-sensitive sealant tape 154 and while the pressure at the exterior surface 136 around the through-hole is reduced, which, in some examples, can be performed as described above in association with block 308 of the method 300 and block 506 of the method 500. The method 400 additionally includes (block 410) removing the pressure-sensitive sealant tape 154 from the interior surface 134 of the hollow bladder 130 after the at least one strip 142 is cured, which, in some examples, can be performed as described above in association with the method 300.

After the pressure-sensitive sealant tape 154 is removed from the interior surface 134 of the hollow bladder, the method 400 may additionally include performing a leak test of the repaired area. The leak test may be performed after surface finishing (e.g., sanding) the repaired area and resealing the repaired area with a new vacuum bag 196, which are both performed after all other components used to heat and cure the strips are removed from the hollow bladder 130. With reduced pressure in the new vacuum bag 196, the leak test includes monitoring the pressure within the new vacuum bag 196 to ensure the pressure does not increase by more than 1 inHg per every 10 minutes. If the repaired area passes the leak test, the method 400 further includes removing the new vacuum bag 196.

Figure 12:
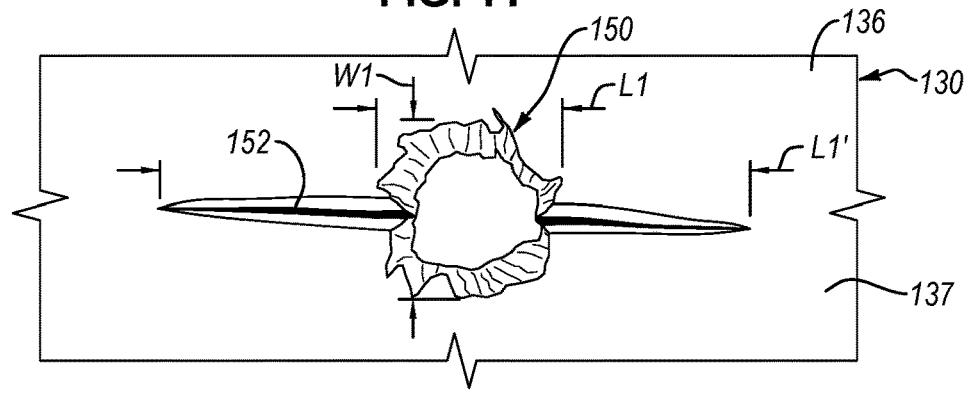
FIG. 12 is a top view of the surface damage of FIG. 11, but enlarged artificially, according to one or more examples of the present disclosure.

The method 400 further includes steps that help facilitate (block 404) sealing the through-hole along the interior surface 134 of the hollow bladder 130 with the pressure-sensitive sealant tape 154 adhered to the interior surface 134 of the hollow bladder 130. According to one example, referring to FIGS. 22-24, the method 400 includes inserting the pressure-sensitive sealant tape 154, from a location exterior to the hollow bladder 130, through the through-hole (e.g., surface damage 144 or surface damage 150) and into an interior cavity 132 of the hollow bladder 130 before (block 404) sealing the through-hole along the interior surface (134) of the hollow bladder (130) with the pressure-sensitive sealant tape 154. Referring to FIG. 12, if the through-hole is not long enough to accommodate the insertion of the pressure-sensitive sealant tape 154 through the through-hole, such as the through-hole 150, the through-hole can be lengthened by an artificial slit 152 such that the length L1' of the modified through-hole is sufficient to allow the pressure-sensitive sealant tape 154 to pass through.

Figure 19:
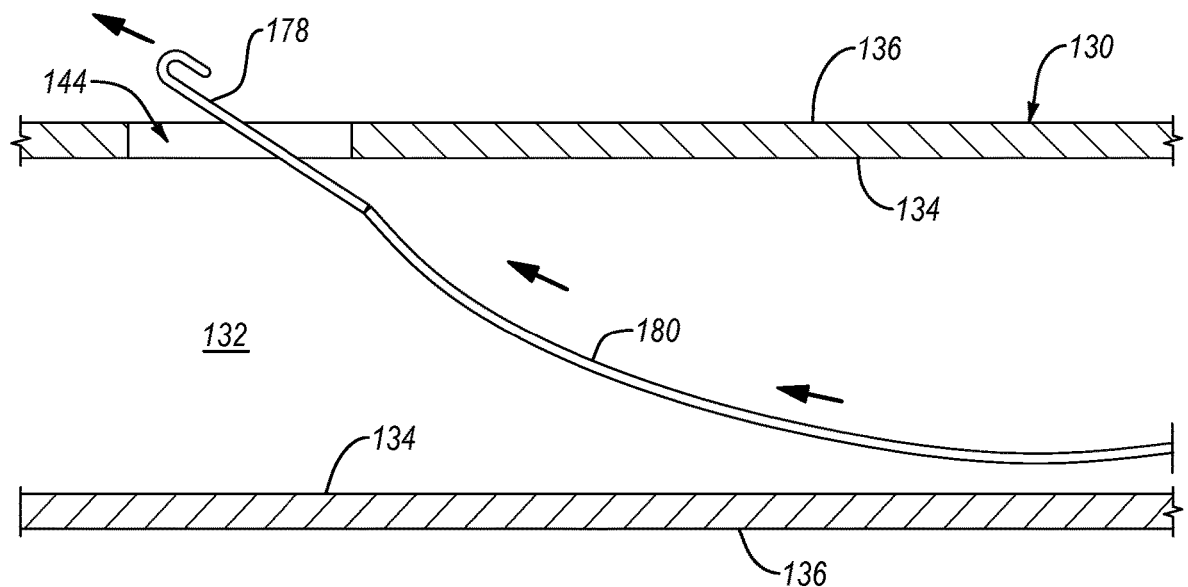
FIG. 19 is a cross-sectional front view of a hook and a retrieval line passing along an interior cavity of a hollow bladder and partially through surface damage in the hollow bladder, according to one or more examples of the present disclosure.

To facilitate insertion of the pressure-sensitive sealant tape 154 through the through-hole and into the interior cavity 132, in some examples, as shown in FIG. 19, the method 400 additionally includes passing a retrieval line 180 and a hook 178, fixed to a leading end of the retrieval line 180, along the interior cavity 132 of the hollow bladder 130 in a first direction (indicated generally by directional arrows) toward the through-hole (e.g., surface damage 144). After passing the retrieval line 180 and the hook 178 along the interior cavity 132 in the first direction, the method 400 also includes inserting the hook 178, from a location within the interior cavity 132, through the through-hole to a location exterior to the hollow bladder 130.

Figure 20:
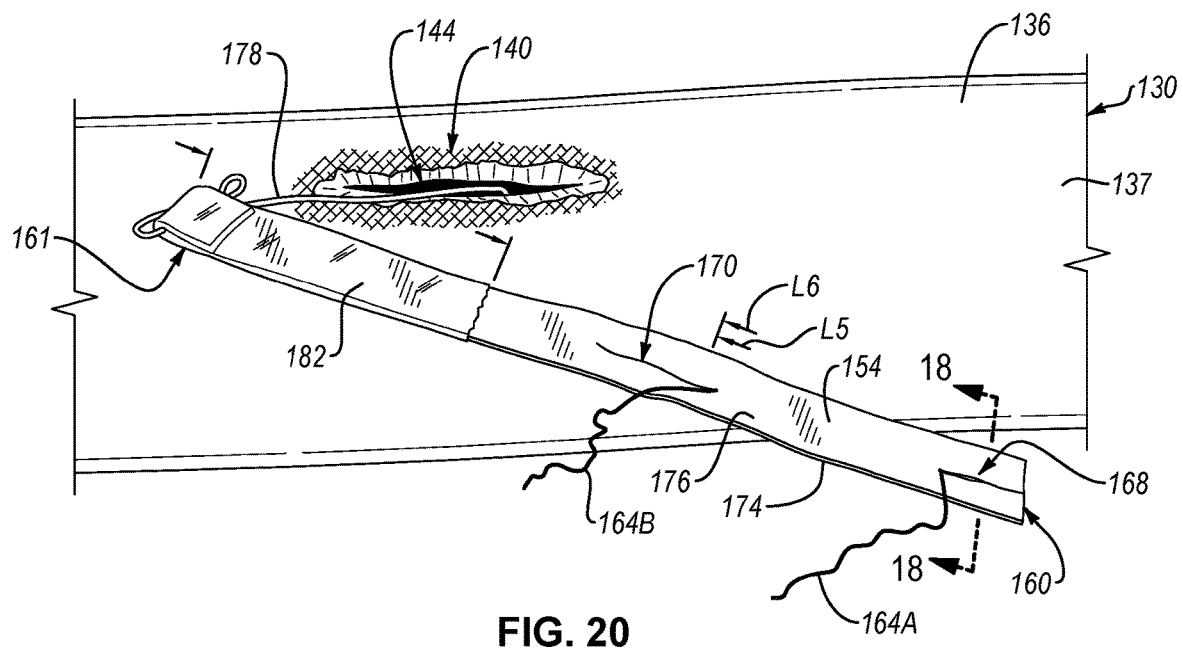
FIG. 20 is a top view of pressure-sensitive sealant tape attached to the hook of FIG. 19, according to one or more examples of the present disclosure.

Referring to FIG. 20, the method 400 further includes attaching the pressure-sensitive sealant tape 154 to the hook 178 after inserting the hook 178 through the through-hole to the location exterior to the hollow bladder 130. The hook 178 is any of various rigid implements configured to receive a second portion 161 of the pressure-sensitive sealant tape 154. In one example, the hook 178 includes a loop or aperture through which the second portion 161 of the pressure-sensitive sealant tape 154 can pass through and double back on itself to attach the pressure-sensitive sealant tape 154 to the hook 178. The retrieval line 180 is a flexible, but strong, line, such as elongated steel fish tape. In some examples, the method 400 additionally includes wrapping the second portion 161 of the pressure-sensitive sealant tape 154 with anti-stick tape 182 as shown in FIG. 20. The anti-stick tape 182 can be wrapped around the end of the second portion 161 that is double backed on itself to promote attachment of the pressure-sensitive sealant tape 154 to itself. The anti-stick tape 182 is a Teflon® tape, such as Nitto Denko P-703 tape, or other similar anti-stick tape in some examples. The anti-stick tape 182 helps ensure the second portion 161 of the pressure-sensitive sealant tape 154 does not stick to the hollow bladder 130.

Figure 21:
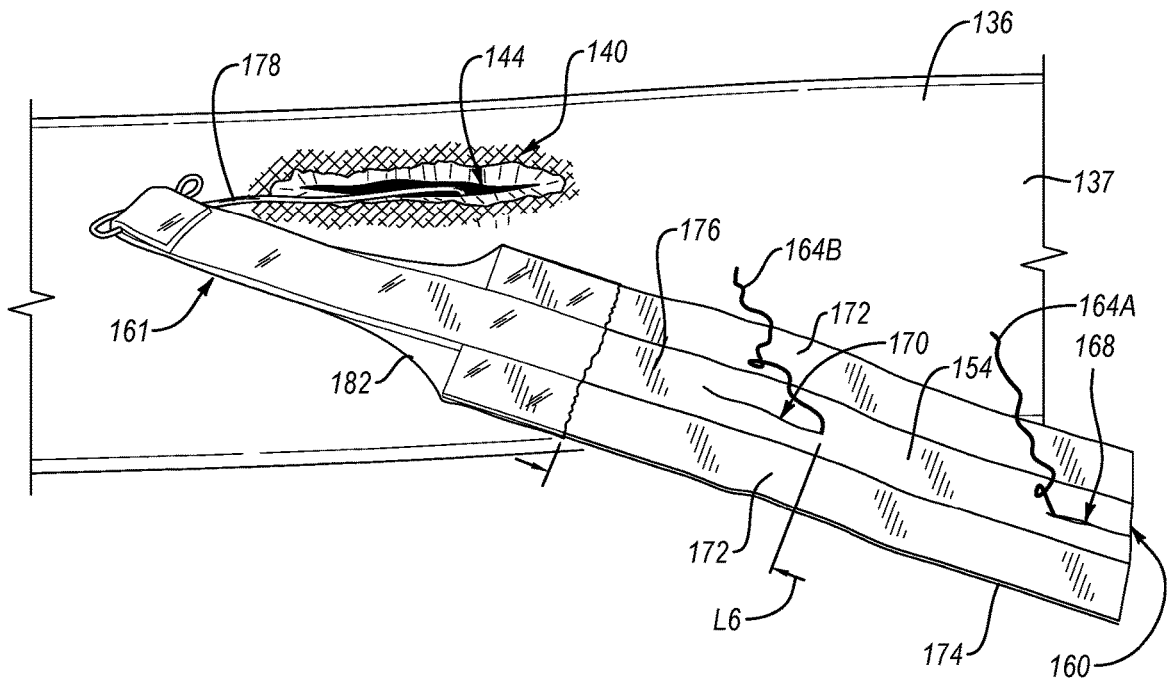
FIG. 21 is a top view of a pressure-sensitive sealant tape assembly, according to one or more examples of the present disclosure.

As shown in FIG. 21, for wider through-holes in the hollow bladder 130, strips of pressure-sensitive sealant tape 154 can be combined to form a pressure-sensitive sealant tape group 155. The group 155 includes a center strip of pressure-sensitive sealant tape 154 and two side strips of pressure-sensitive sealant tape 15 secured to each other in a side-by-side manner. The center strip is longer than the side strips by a length L5 (see, e.g., FIG. 17). The anti-stick tape 182 is wrapped around the second portions 162 of the center strip and the side strips. In certain examples, the anti-stick tape 182 forms a bridge, which is triangular-shaped in the illustrated example, that bridges a gap between the center strip and the side strips. The bridge helps to strengthen the group 155 and keep the side strips attached to the center strip as the group 155 is peeled away from the interior surface 134 of the hollow bladder 130 after curing the repair strips as described above.

Figure 22:
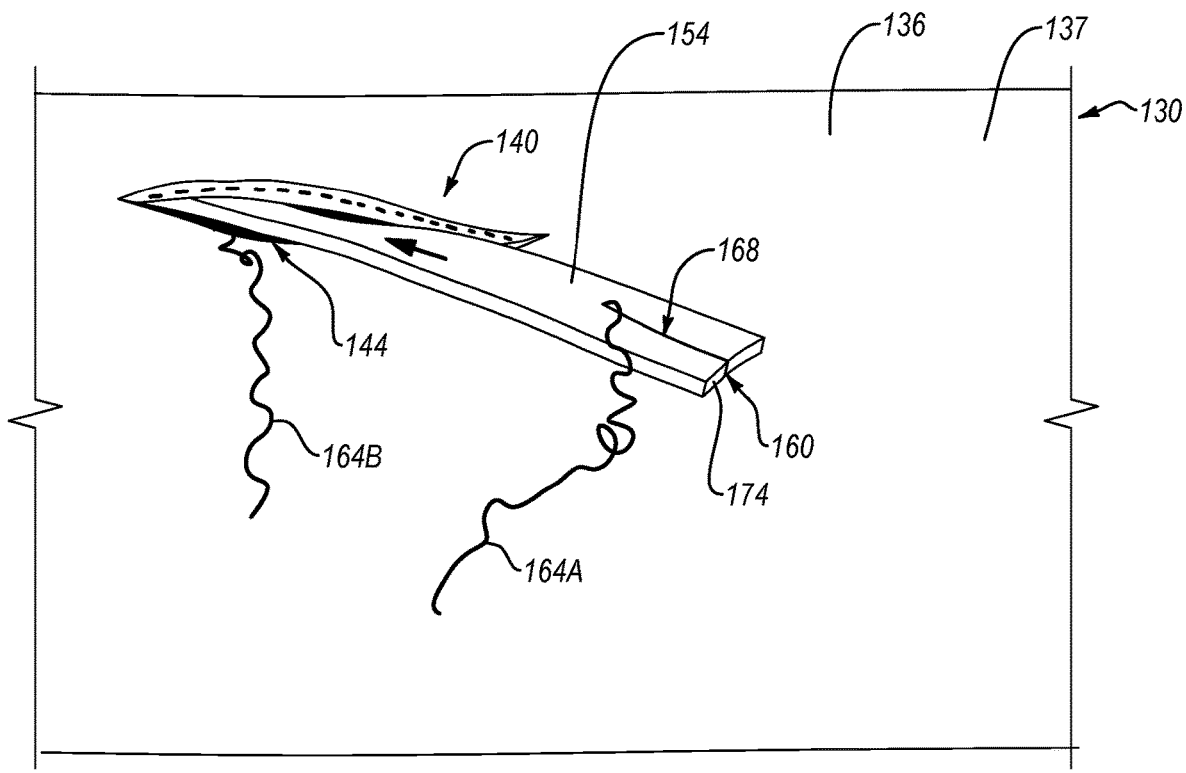
FIG. 22 is a top view of the pressure-sensitive sealant tape of FIG. 20, being passed through the surface damage in the hollow bladder from outside the hollow bladder to inside the hollow bladder, according to one or more examples of the present disclosure.
Figure 23:
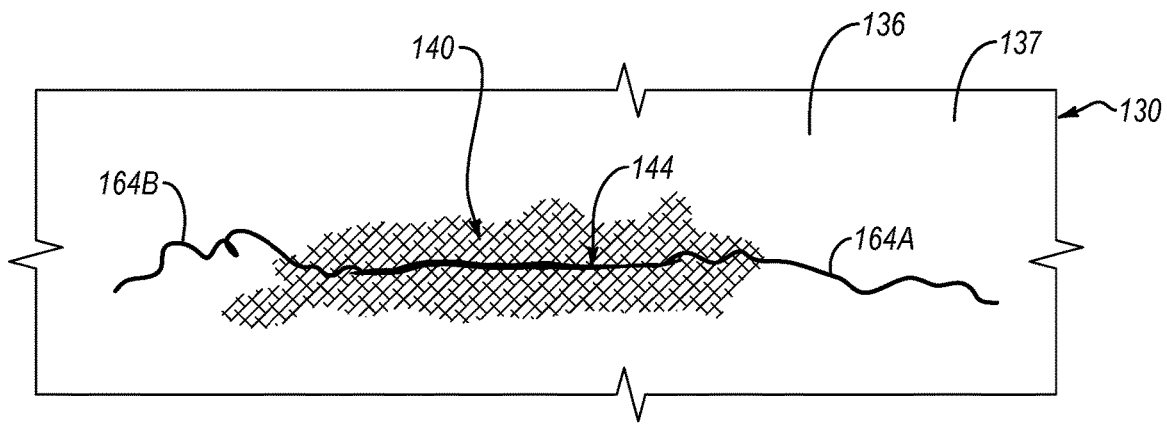
FIG. 23 is a top view of the hollow bladder of FIG. 22, with the pressure-sensitive sealant tape entirely within the hollow bladder and installation lines 164 extending through the surface damage from inside the hollow bladder to outside the hollow bladder, according to one or more examples of the present disclosure.

Referring to FIGS. 22 and 23, after attaching the second portion 161 of the pressure-sensitive sealant tape 154 to the hook 178, the method 400 includes inserting the hook 178, from the location exterior to the hollow bladder 130, through the through-hole and into the interior cavity 132 of the hollow bladder 130 in substantially the first direction (as indicated by a directional arrow). With the pressure-sensitive sealant tape 154 attached to the hook 178, inserting the hook 178 in this manner results in the pressure-sensitive sealant tape 154 being inserted, from the location exterior to the hollow bladder 130, through the through-hole and into the interior cavity 132 in substantially the first direction.

Before inserting the pressure-sensitive sealant tape 154 through the through-hole and into the interior cavity 132, the pressure-sensitive sealant tape 154 is equipped to facilitate adhesive attachment of the pressure-sensitive sealant tape 154 to the interior surface 134 of the hollow bladder 130 to seal the through-hole from the inside. First, in one example shown in FIGS. 15 and 16, the method 400 includes attaching an installation line 164 to a first portion 160 of the pressure-sensitive sealant tape 154 before the pressure-sensitive sealant tape 154 is inserted through the through-hole and into the interior cavity 132 of the hollow bladder 130. The first portion 160 is opposite the second portion 161 of the pressure-sensitive sealant tape 154. The installation line 164 is a single continuous length of a flexible chord, such as a thread of rymplecloth, in one example. Alternatively, the installation line 164 may include two or more separate flexible chords. Whether a single continuous length or multiple separate lengths of flexible chord, the installation line 164 includes a first end portion 164A and a second end portion 164B.

Figure 15:
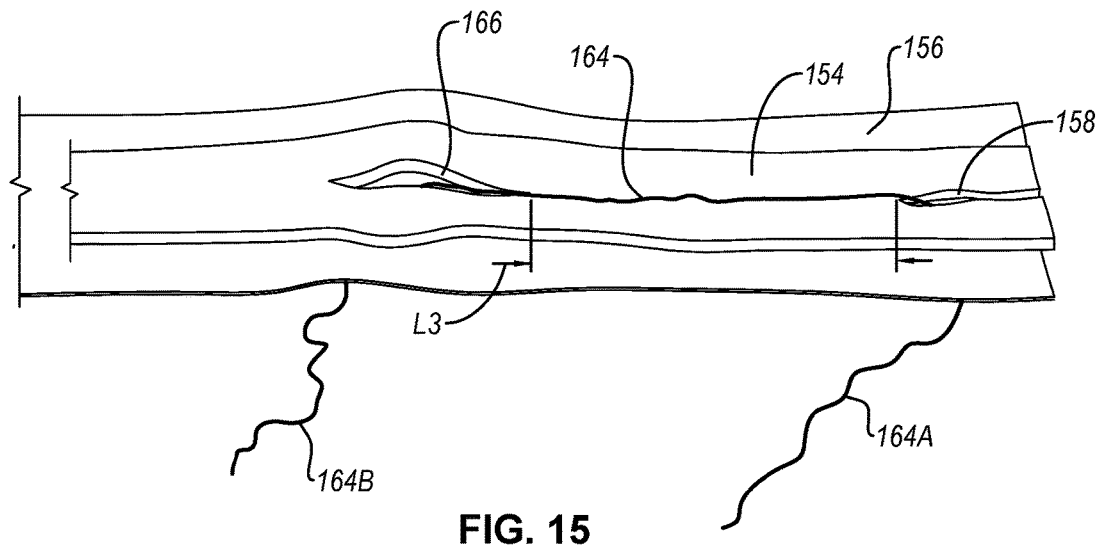
FIG. 15 is a top view of pressure-sensitive sealant tape and an installation line attached to the pressure-sensitive sealant tape, according to one or more examples of the present disclosure.
Figure 16:
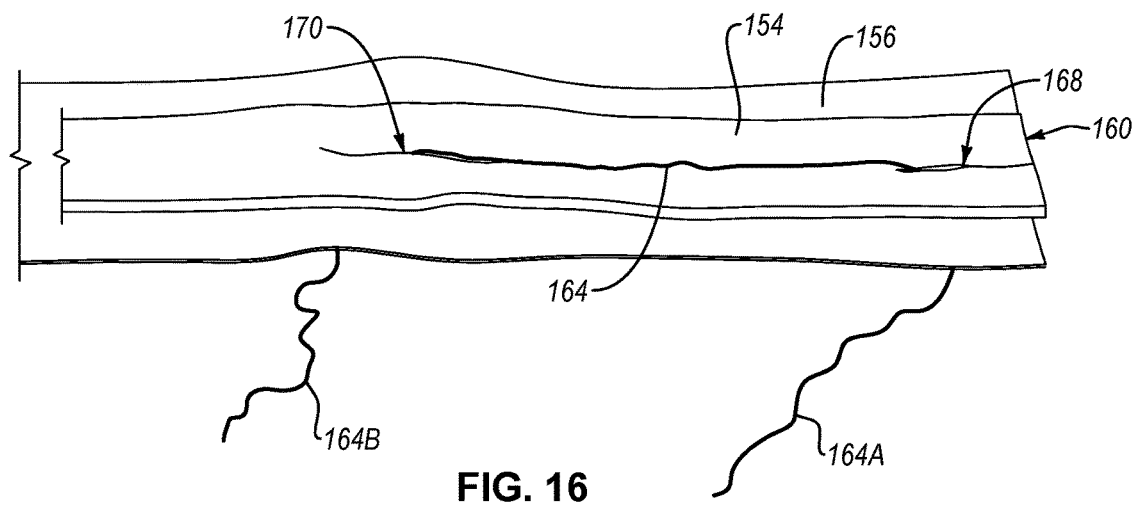
FIG. 16 is a top view of the pressure-sensitive sealant tape and the installation line, according to one or more examples of the present disclosure.
Figure 17:
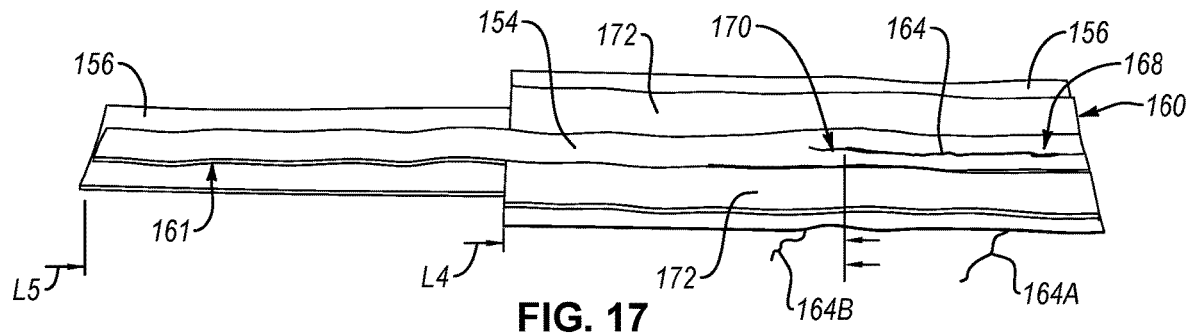
FIG. 17 is a top view of pressure-sensitive sealant tape and an installation line attached to the pressure-sensitive sealant tape, according to one or more examples of the present disclosure.

In one example, attaching the installation line 164 to the pressure-sensitive sealant tape 154 includes attaching the first end portion 164A to a first location on the pressure-sensitive sealant tape 154 and attaching the second end portion 164B to a second location on the pressure-sensitive sealant tape 154. The first location is spaced apart from the second location by a distance L3 that is less than a maximum length of the through-hole (see, e.g., FIG. 15). Referring to FIG. 15, in some examples, the installation line 164 is attached to the pressure-sensitive sealant tape 154 by forming a pair of slits in the first end portion 160 of the pressure-sensitive sealant tape 154. A first slit 158 is formed in an end of the first end portion 160 and a second slit 166 is formed at an intermediate location the distance L3 away from the first slit 158. The installation line 164 is inserted into the first slit 158 and passed through the second slit 166 such that an intermediate portion of the installation line 164 extends between the first slit 158 and the second slit 166 on one side of the pressure-sensitive sealant tape 154 and the first end portion 164A and the second end portion 164B extend from the first slit 158 and the second slit 166, respectively, on an attachment side 176 of the pressure-sensitive sealant tape 154 (see, e.g., FIG. 18). After the installation line 164 is located within the first slit 158 and the second slit 166 in this manner, the first slit 158 and the second slit 166 are collapsed or closed, by pressing opposing sides of the slits into adhesive contact, to form a first joint line 168 and a second joint line 170, respectively.

Figure 18:
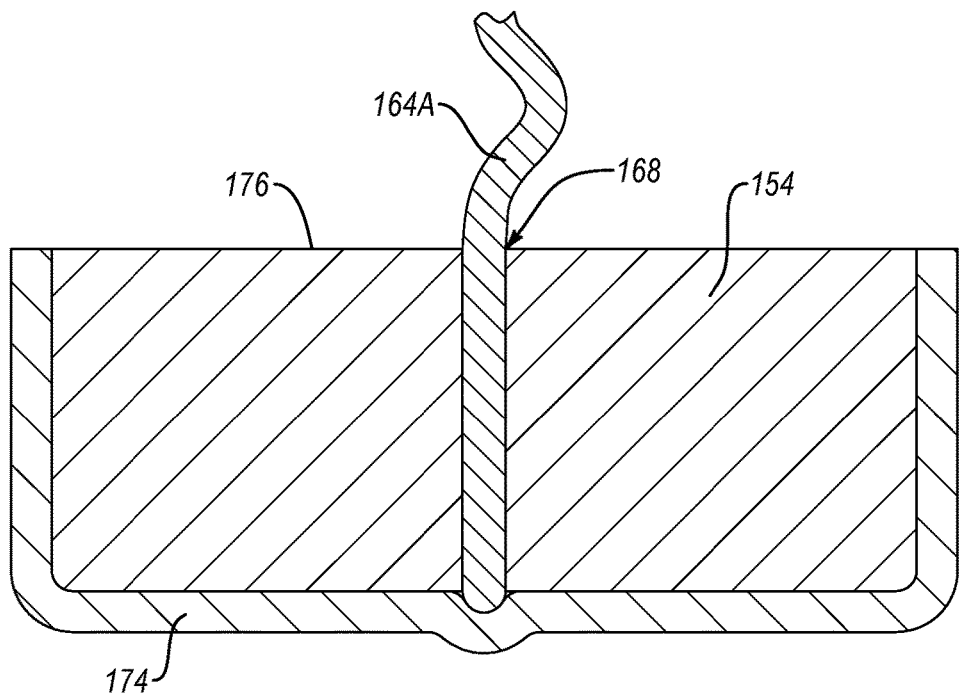
FIG. 18 is a cross-sectional side view of pressure-sensitive sealant tape, an installation line attached to the pressure-sensitive sealant tape, and anti-stick tape applied onto a portion of the pressure-sensitive sealant tape, according to one or more examples of the present disclosure.

Referring to FIG. 18, in one example, anti-stick tape 174, which can be similar to the anti-stick tape 182, is wrapped partially around the pressure-sensitive sealant tape 154 along a length of the pressure-sensitive sealant tape 154. The anti-stick tape 174 is not applied to the attachment side 176 of the pressure-sensitive sealant tape 154. In other words, in some examples, the anti-stick tape 174 is applied onto every surface of the pressure-sensitive sealant tape 154 except the attachment side 176 of at least the first portion 160 of the pressure-sensitive sealant tape 154. The anti-stick tape 174 helps to ensure that only the attachment side 176 of the first portion 160 of the pressure-sensitive sealant tape 154 is adhesively attached to the interior surface 134 of the hollow bladder 130. In the illustrated example, after attaching the installation line 164 to the pressure-sensitive sealant tape 154 and attaching the anti-stick tape 174 to the pressure-sensitive sealant tape 154, the pressure-sensitive sealant tape 154 is ready to be inserted through the through-hole and into the interior cavity 132 of the hollow bladder 130.

Figure 24:
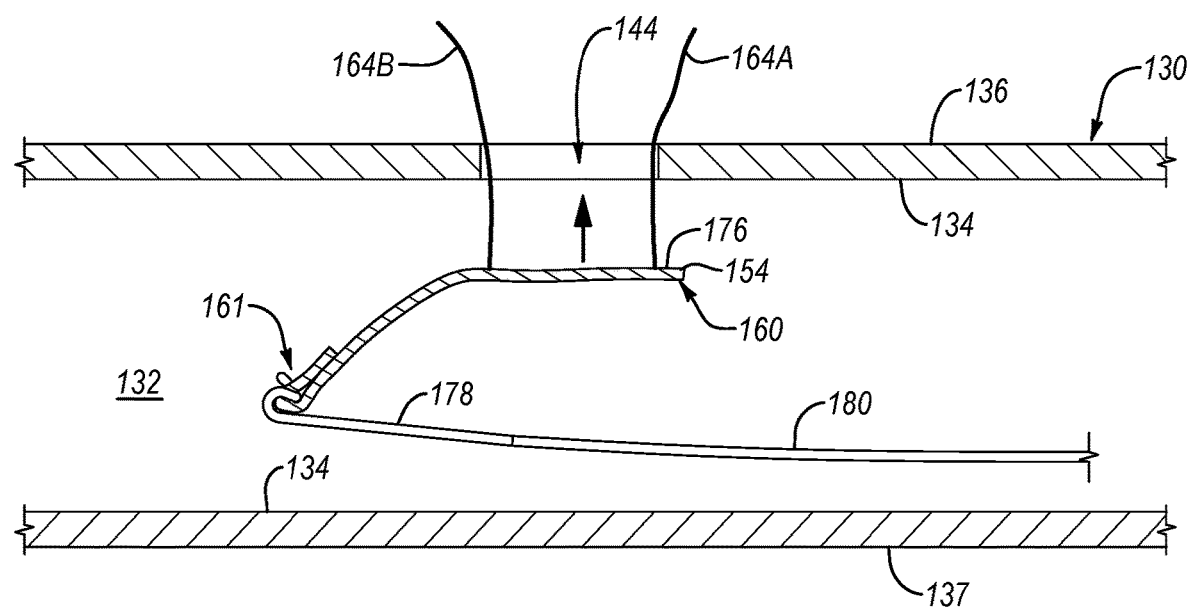
FIG. 24 is a cross-sectional front view of the pressure-sensitive sealant tape of FIG. 23 suspended within hollow bladder by installation lines, according to one or more examples of the present disclosure.
Figure 25:
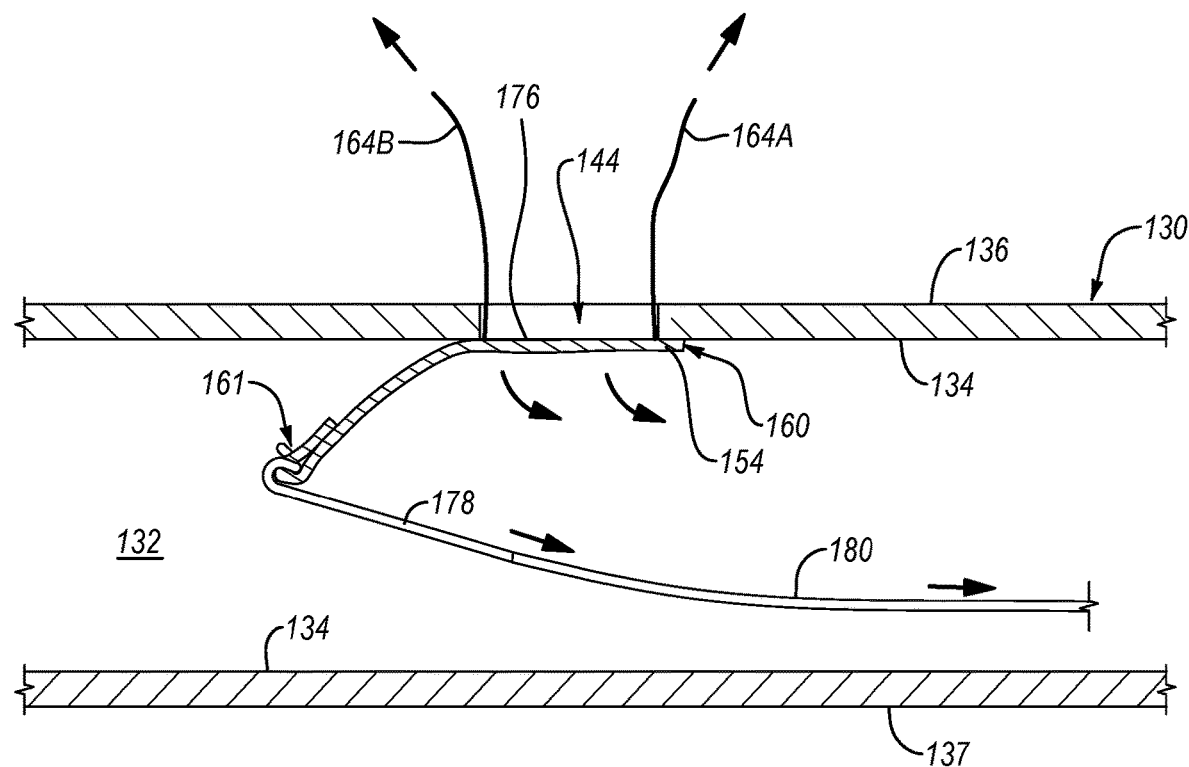
FIG. 25 is a cross-sectional front view of the pressure-sensitive sealant tape of FIG. 24 raised into adhering contact with an interior surface of the hollow bladder, over the surface damage, by pulling up on the installation lines, according to one or more examples of the present disclosure.

Referring to FIGS. 23-25, inserting the pressure-sensitive sealant tape 154 into the interior cavity 132 includes inserting a first portion of the first end portion 164A and a first portion of the second end portion 164B of the installation line 164 through the through-hole and into the interior cavity 132 along with the entirety of the pressure-sensitive sealant tape 154. Additionally, inserting the pressure-sensitive sealant tape 154 into the interior cavity 132 includes leaving a second portion of the first end portion 164A and a second portion of the second end portion 164B of the installation line 164 exteriorly or outside of the hollow bladder 130 after the pressure-sensitive sealant tape 154 is fully inserted into the interior cavity 132 (see, e.g., FIG. 24).

As shown in FIG. 25, with the pressure-sensitive sealant tape 154 entirely within the interior cavity 132 of the hollow bladder 130 and the installation line 164 arranged as described above, the pressure-sensitive sealant tape 154 is sealed against the interior surface 134 of the hollow bladder 130 over the through-hole by pulling the second portion of the first end portion 164A and the second portion of the second end portion 164B of the installation line 164 away from the interior cavity 132. Pulling the installation line 164 in this manner raises the pressure-sensitive sealant tape 154 into adhering contact with the interior surface 134 of the hollow bladder 130. In some examples, the second portion of the first end portion 164A and the second portion of the second end portion 164B of the installation line 164 are pulled evenly so that the attachment surface 176 of the pressure-sensitive sealant tape 154 remains parallel to the interior surface 134 as it is raised and adhered to the interior surface 134. After the pressure-sensitive sealant tape 154 is adhered to the interior surface 134, the installation line 164 protruding out of the through-hole is trimmed and removed. With the pressure-sensitive sealant tape 154 adhered against the interior surface 134 to seal the interior side of the through-hole, according to block 402 and the strip or strips within the through-hole of the bladder 130, according to block 404, the method 400 can proceed to execute blocks 406-410 as described above.

After block 410 of the method 400 is completed, in one example, removing the pressure-sensitive sealant tape 154 at block 412 is performed by passing the pressure-sensitive sealant tape 154 along the interior cavity 132 of the hollow bladder 130 and out of the hollow bladder 130 at a location away from the through-hole. In some example, as shown in FIG. 25, the pressure-sensitive sealant tape 154 is removed by pulling the retrieval line 180 in a second direction, opposite the first direction, to peel the pressure-sensitive sealant tape 154 away from the interior surface 134 of the hollow bladder 130. Because the hook 178 is attached to the second end 161 of the pressure-sensitive sealant tape 154, pulling on the retrieval line 180 in the section direction peels the pressure-sensitive sealant tape 154 back over itself as the tape releases from the interior surface 134. In some examples, tools, such as parallel rods, can be used to help remove the pressure-sensitive sealant tape 154 from the hollow bladder 130 without the attachment surface 176 of the pressure-sensitive sealant tape 154 sticking to the hollow bladder 130 as the tape is removed.

Figure 40:
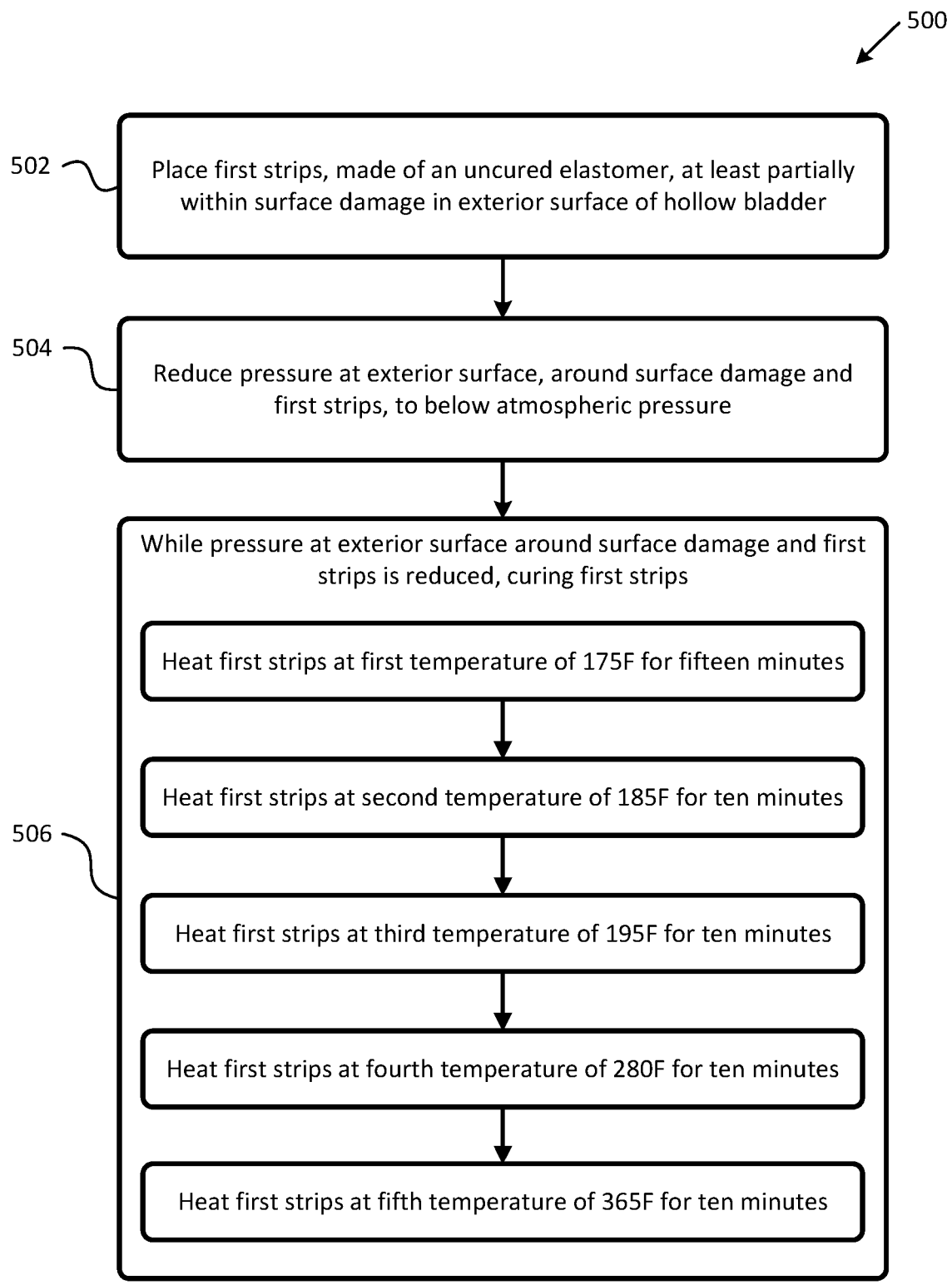
FIG. 40 is a schematic flow chart of a method of repairing surface damage in an exterior surface of a hollow bladder, according to one or more examples of the present disclosure.

Referring to FIG. 40, according to some examples, disclosed herein is a method 500 of repairing surface damage in the exterior surface 136 of the hollow bladder 130. The method 500 includes steps analogous to some of the steps of the method 300 and the method 400. For example, the method 500 includes (block 502) placing first strips 142, made of an uncured fluoroelastomer, at least partially within the surface damage in the exterior surface 136 of the hollow bladder 130, which, in some examples, can be performed as described above in association with block 302 of the method 300 and/or block 404 of the method 400. The method 500 also includes (block 504) reducing a pressure at the exterior surface 136, around the surface damage and the first strips 142, to below atmospheric pressure, which, in some examples, can be performed as described above in association with block 306 of the method 300 and block 406 of the method 400. Optionally, the method 500 may include sealing an interior of the surface damage if the surface damage is a through-hole, similar to block 402 of the method 400. Additionally, the method 500 includes (block 506) curing the first strips 142, while the pressure at the exterior surface 136 around the surface damage and the first strips 142 is reduced.

Although the steps for preparing the hollow bladder 130 and the first strips 142 to receive heat may be analogous to those described above in association with block 308 of the method 300 and block 408 of the method 400, block 506 of the method 500 includes a particular cure/heating program for curing the first strips 142. In one example, block 506 of the method 500 cures the first strips 142, and uncured second strips 143 if applicable, by performing the following steps in order: (1) heating the first strips (142) at a first temperature of 175 F for fifteen minutes; (2) heating the first strips (142) at a second temperature of 185 F for ten minutes; (3) heating the first strips (142) at a third temperature of 195 F for ten minutes; (4) heating the first strips (142) at a fourth temperature of 280 F for ten minutes; and (5) heating the first strips (142) at a fifth temperature of 365 F for ten minutes. In certain examples, the rate at which the heat applied to the first strips 142 is increased from step to step is about 5 F per minute.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of repairing surface damage in an exterior surface of a hollow bladder, made of a cured elastomer, the method comprising:
   placing first strips, made of an uncured elastomer, at least partially within the surface damage in the exterior surface of the hollow bladder in a side-by-side arrangement such that a narrow slit defined between the first strips is positioned over the surface damage;
   sealing the surface damage, the first strips, and a portion of the exterior surface surrounding the surface damage in a vacuum bag;
   reducing pressure within the vacuum bag relative to outside the vacuum bag; and
   while the pressure within the vacuum bag is reduced, heating the first strips from within the vacuum bag to cure the first strips.

2. The method according to claim 1, further comprising:
   applying a peel ply onto the exterior surface of the hollow bladder away from the surface damage in the exterior surface;
   placing a caul plate assembly, comprising a caul plate and a breathable release film, onto the exterior surface, over an entirety of the surface damage in the exterior surface, and onto the peel ply such that the breathable release film is interposed between the surface damage and the caul plate and the breathable release film is interposed between the peel ply and the caul plate;
   placing a heating blanket onto the caul plate assembly; and
   sealing the peel ply, the caul plate assembly, and the heating blanket, together with the surface damage, the first strips, and the portion of the exterior surface surrounding the surface damage, in the vacuum bag;
   wherein the first strips are heated from within the vacuum bag by the heating blanket.

3. The method according to claim 2, further comprising:
   placing a woven polyester ply onto the heating blanket such that the woven polyester ply is interposed between the heating blanket and the vacuum bag; and
   sealing the woven polyester ply within the vacuum bag.

4. The method according to claim 2, further comprising applying a secondary peel ply onto the heating blanket such that the heating blanket is interposed between the secondary peel ply and the caul plate assembly.

5. The method according to claim 1, wherein sealing the surface damage, the first strips, and a portion of the exterior surface surrounding the surface damage in the vacuum bag comprises:
   applying a pressure-sensitive sealant tape onto the exterior surface of the hollow bladder; and
   adhering the vacuum bag to the pressure-sensitive sealant tape.

6. The method according to claim 1, wherein:
   the surface damage is a through-hole, extending from the exterior surface to an interior surface of the hollow bladder; and
   the method further comprises placing second strips, made of the uncured elastomer, within the through-hole in a stacked arrangement such that the second strips are interposed between the first strips and an interior cavity of the hollow bladder.

7. The method according to claim 6, further comprising placing a third strip, made of a fiber-reinforced polymer, within the through-hole between the second strips.

8. The method according to claim 6, further comprising placing third strips, made of a fiber-reinforced polymer, within the through-hole between the second strips such that each one of the third strips is sandwiched between a respective two of the second strips.

9. The method according to claim 6, further comprising forming a bevel around an entire perimeter of the through-hole, wherein the first strips are further placed at least partially within a space defined by the bevel.

10. The method according to claim 6, further comprising sealing the through-hole along the interior surface of the hollow bladder with a pressure-sensitive sealant tape adhered to the interior surface of the hollow bladder.

11. The method according to claim 1, wherein:
the surface damage has a depth extending into a thickness of the hollow bladder;
the surface damage has a width;
each one of the first strips has a width; and
the width of each one of the first strips is less than the width of the surface damage.

12. The method according to claim 10, further comprising placing a release film within the through-hole between the second strips and the pressure-sensitive sealant tape.

13. A method of repairing a through-hole in a hollow bladder, made of a cured elastomer, the through-hole extending from an exterior surface of the hollow bladder to an interior surface of the hollow bladder and the method comprising:
placing strips, made of an uncured elastomer, within the through-hole of the hollow bladder such that a narrow slit defined between the strips is positioned over the through-hole;
sealing the through-hole along the interior surface of the hollow bladder with a pressure-sensitive sealant tape adhered to the interior surface of the hollow bladder;
reducing a pressure at the exterior surface around the through-hole, to below atmospheric pressure, after the through-hole is sealed along the interior surface with the pressure-sensitive sealant tape;
curing the strips by heating the strips while the through-hole is sealed along the interior surface by the pressure-sensitive sealant tape and while the pressure at the exterior surface around the through-hole is reduced; and
removing the pressure-sensitive sealant tape from the interior surface of the hollow bladder after the strips are cured.

14. The method according to claim 13, further comprising inserting the pressure-sensitive sealant tape, from a location exterior to the hollow bladder, through the through-hole and into an interior cavity of the hollow bladder before sealing the through-hole along the interior surface of the hollow bladder with the pressure-sensitive sealant tape, wherein removing the pressure-sensitive sealant tape from the interior surface of the hollow bladder comprises passing the pressure-sensitive sealant tape along the interior cavity of the hollow bladder and out of the hollow bladder at a location away from the through-hole.

15. The method according to claim 14, further comprising:
passing a retrieval line and a hook, fixed to a leading end of the retrieval line, along the interior cavity of the hollow bladder in a first direction toward the through-hole;
after passing the retrieval line and the hook along the interior cavity in the first direction, inserting the hook, from a location within the interior cavity, through the through-hole to the location exterior to the hollow bladder;
attaching the pressure-sensitive sealant tape to the hook after inserting the hook through the through-hole to the location exterior to the hollow bladder; and
after attaching the pressure-sensitive sealant tape to the hook, inserting the hook, from the location exterior to the hollow bladder, through the through-hole and into the interior cavity of the hollow bladder in substantially the first direction to insert the pressure-sensitive sealant tape, from the location exterior to the hollow bladder, through the through-hole and into the interior cavity in substantially the first direction.

16. The method according to claim 15, wherein removing the pressure-sensitive sealant tape from the interior surface of the hollow bladder comprises pulling the retrieval line in a second direction, substantially opposite the first direction, through the interior cavity of the hollow bladder to pull the pressure-sensitive sealant tape away from the interior surface and through the interior cavity of the hollow bladder in the second direction.

17. The method according to claim 15, wherein:
the pressure-sensitive sealant tape comprises a first portion, having a first length greater than a length of the through-hole, and a second portion spaced apart from the first portion;
the second portion is attached to the hook; and
the method further comprises wrapping the second portion of the pressure-sensitive sealant tape with anti-stick tape.

18. The method according to claim 14, further comprising attaching an installation line to the pressure-sensitive sealant tape before the pressure-sensitive sealant tape is inserted through the through-hole and into the interior cavity of the hollow bladder, wherein sealing the through-hole along the interior surface of the hollow bladder with the pressure-sensitive sealant tape comprises:
inserting a first portion of the installation line through the through-hole and into the interior cavity along with the pressure-sensitive sealant tape;
leaving a second portion of the installation line exteriorly of the hollow bladder after the pressure-sensitive sealant tape is inserted into the interior cavity; and
with the pressure-sensitive sealant tape inserted into the interior cavity, pulling the second portion of the installation line away from the interior cavity to raise the pressure-sensitive sealant tape into adhering contact with the interior surface of the hollow bladder.

19. The method according to claim 18, wherein:
attaching the installation line to the pressure-sensitive sealant tape comprises attaching a first end portion to a first location on the pressure-sensitive sealant tape and attaching a second end portion to a second location on the pressure-sensitive sealant tape;
the first location is spaced apart from the second location by a distance less than a maximum length of the through-hole;
inserting the first portion of the installation line through the through-hole and into the interior cavity comprises inserting a first portion of the first end portion of the installation line and a first portion of the second end portion of the installation line through the through-hole and into the interior cavity;
leaving a second portion of the installation line exteriorly of the hollow bladder after the pressure-sensitive sealant tape is inserted into the interior cavity comprises leaving a second portion of the first end portion of the installation line and a second portion of the second end portion of the installation line exteriorly of the hollow bladder after the pressure-sensitive sealant tape is inserted into the interior cavity; and
pulling the second portion of the installation line away from the interior cavity comprises evenly pulling the second portion of the first end portion and the second portion of the second end portion of the installation line away from the interior cavity.

20. A method of repairing surface damage in an exterior surface of a hollow bladder, made of a cured fluoroelastomer, the method comprising:
- placing first strips, made of an uncured fluoroelastomer, at least partially within the surface damage in the exterior surface of the hollow bladder;
- reducing a pressure at the exterior surface, around the surface damage and the first strips, to below atmospheric pressure; and
- while the pressure at the exterior surface around the surface damage and the first strips is reduced, curing the first strips, by, in order:
- heating the first strips at a first temperature of 175 F for fifteen minutes;
- heating the first strips at a second temperature of 185 F for ten minutes;
- heating the first strips at a third temperature of 195 F for ten minutes;
- heating the first strips at a fourth temperature of 280 F for ten minutes; and
- heating the first strips at a fifth temperature of 365 F for ten minutes.

\* \* \* \* \*